(12) United States Patent
Okada et al.

(10) Patent No.: US 7,368,009 B2
(45) Date of Patent: *May 6, 2008

(54) CARBON FINE PARTICLE STRUCTURE AND PROCESS FOR PRODUCING THE SAME, CARBON FINE PARTICLE TRANSCRIPTIONAL BODY FOR PRODUCING THE SAME, SOLUTION FOR PRODUCING CARBON FINE PARTICLE STRUCTURE, CARBON FINE PARTICLE STRUCTURE, ELECTRONIC DEVICE USING CARBON FINE PARTICLE STRUCTURE AND PROCESS FOR PRODUCING THE SAME, AND INTEGRATED CIRCUIT

(75) Inventors: Shinsuke Okada, Kanagawa (JP);
Masaki Hirakata, Kanagawa (JP);
Chikara Manabe, Kanagawa (JP);
Kazunori Anazawa, Kanagawa (JP);
Taishi Shigematsu, Kanagawa (JP);
Miho Watanabe, Kanagawa (JP);
Kentarou Kishi, Kanagawa (JP);
Takashi Isozaki, Kanagawa (JP);
Shigeki Ooma, Kanagawa (JP);
Hiroyuki Watanabe, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 11/034,088

(22) Filed: Jan. 13, 2005

(65) Prior Publication Data
US 2005/0284336 A1   Dec. 29, 2005

(30) Foreign Application Priority Data
Jun. 25, 2004  (JP) .............................. 2004-188823

(51) Int. Cl.
C09C 1/44 (2006.01)
C01B 31/04 (2006.01)
D01F 9/12 (2006.01)

(52) U.S. Cl. .................. 106/472; 423/448; 423/447.1; 423/447.2

(58) Field of Classification Search ............. 423/447.2, 423/447.1; 106/472; 424/443; 528/336; 264/463; 361/303
See application file for complete search history.

(56) References Cited

U.S. PATENT DOCUMENTS 4,645,823 A * 2/1987 Ai et al. ..................... 528/336

(Continued)

FOREIGN PATENT DOCUMENTS

| JP | 2001-94107 | 4/2001 |
| JP | 2003-502874 | 1/2003 |
| JP | 2003-292588 | 10/2003 |

OTHER PUBLICATIONS

"Grafted and cross-linked carbon black as an electrode material for double layer capacitors" t, Richner et al., 2002, Carbon 40-(2002) 307-314.*

(Continued)

*Primary Examiner*—J. A. Lorengo
*Assistant Examiner*—Shuangyi Abu-Ali
(74) *Attorney, Agent, or Firm*—Oliff & Berridge, PLC

(57) ABSTRACT

A carbon fine particle structure containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure, and a process for producing the same are provided. A carbon fine particle transcriptional body and a solution for producing the carbon fine particle structure, an carbon fine particle structure electronic device using the carbon fine particle structure and a process for producing the same, and an integrated circuit using the same are provided.

9 Claims, 7 Drawing Sheets

U.S. PATENT DOCUMENTS

| | | | | |
|---|---|---|---|---|
| 4,880,577 | A | * | 11/1989 | Okita et al. .................. 264/463 |
| 6,031,711 | A | * | 2/2000 | Tennent et al. ............. 361/303 |
| 6,203,814 | B1 | * | 3/2001 | Fisher et al. ................. 424/443 |
| 6,934,144 | B2 | * | 8/2005 | Ooma et al. ................. 361/303 |
| 7,125,533 | B2 | * | 10/2006 | Khabashesku et al. ... 423/447.1 |
| 2004/0202603 | A1 | * | 10/2004 | Fischer et al. ........... 423/447.2 |

OTHER PUBLICATIONS

Dimitrakopoulos et al; "Organic Thin Film Transistors for Large Area Electronics"; Advanced Materials, 14, No. 2, pp. 99-117; Jan. 16, 2002.

Klauk et al; "High-Mobility Polymer Gate Dielectric Pentacene Thin Film Transistors"; Journal of Applied Physics; vol. 92, No. 9; pp. 5259-5263; Nov. 1, 2002.

Y.L. Lyubchenko et al; "Atomic Force Microscopy of DNA and Bacteriophage in Air, Water and Propanol": The Role of Adhesion Forces; "Nucleic Acids Research", vol. 21, No. 5; pp. 1117-1123; 1993.

* cited by examiner

CARBON FINE PARTICLE STRUCTURE AND PROCESS FOR PRODUCING THE SAME, CARBON FINE PARTICLE TRANSCRIPTIONAL BODY FOR PRODUCING THE SAME, SOLUTION FOR PRODUCING CARBON FINE PARTICLE STRUCTURE, CARBON FINE PARTICLE STRUCTURE, ELECTRONIC DEVICE USING CARBON FINE PARTICLE STRUCTURE AND PROCESS FOR PRODUCING THE SAME, AND INTEGRATED CIRCUIT

BACKGROUND OF THE INVENTION

1. Field of the Invention

The present invention relates to a carbon fine particle structure as a useful novel substance that is obtained by structuralizing an inexpensive carbon fine particle material, such as carbon black and graphite, a process for producing the same, a carbon fine particle transcriptional body for producing the same, and a solution for producing a carbon fine particle structure.

The invention also relates to a carbon fine particle structure electronic device and an integrated circuit having high usefulness using the carbon fine particle structure, and a process for producing the carbon fine particle structure electronic device.

2. Description of the Related Art

A carbon fine particle material, such as carbon black and graphite, has been used as a conductive paste, a pigment and a conductivity imparting agent for rubber and plastics. The carbon fine particle material is superior since it has corrosion resistance and heat resistance, which cannot be attained by a metallic material, can be used as a conductive material having good sliding property, and exerts a low environmental load with low cost. However, the particle diameter of the carbon fine particle material cannot be increased from the technical and cost conditions, and the material is limited in use as a dispersed material.

In the case where carbon fine particles can be chemically bonded to each other to form a conformation like a polymer, it is expected that the mechanical strength and the film forming property thereof can be improved, whereby the applications thereof are broadened to an electronic device part, such as an electrode, formed of the material solely, with the characteristics inherent to the carbon fine particles being exploited. Furthermore, there is another possibility that novel characteristics arise in electroconductivity or the like, for example, by selecting a crosslinking agent.

Along with the progress in information technology in recent years, development of a thin film transistor (TFT) used in a display and a communication equipment receives interest. Amorphous silicon and polysilicon have been currently used mainly as a semiconductor material for TFT. However, the production of the semiconductor device generally requires a vacuum process, such as sputtering, and a high temperature process. Accordingly, only a limited and high-cost material can be selected as a substrate, and therefore, the application of the semiconductor device obtained through the device production process using the substrate material is limited in cost and capability.

Such other requirements are also arising in TFT as flexibility and production on a large area. According thereto, an organic semiconductor (organic TFT) receives attention, in which a device can be produced (i) on a flexible substrate, such as plastics, (ii) on a large area (iii) by a low-cost process, such as printing.

Wide varieties of materials including from low molecular weight materials to high molecular weight materials have been reported as a material for the organic TFT, such as pentacene, phthalocyanine, fullerene and polythiophene, as disclosed in Advanced Material, vol. 2, p. 99 (2002) (review). However, the production process with low temperature and low cost and the high capability are conflicting demands, and it is difficult to attain both of them simultaneously.

For example, a material exerting high capability, such as pentacene, requires production by a vapor deposition process in high vacuum, which is not desired from the standpoint of obtaining a large area and attaining a low-cost production process. An organic semiconductor material, such as polymer compound, can be easily produced as the device with high productivity, but the sufficient capability cannot be obtained.

The most of the organic semiconductor materials are of p type, but there are fewer kinds of materials exhibiting the n type behavior, and moreover the stable operation thereof can be attained only in vacuum or in a nitrogen atmosphere.

Consequently, such a polymer organic semiconductor material has been demanded that attains high capability with the convenience in production process maintained.

JP-A-2003-292588, JP-A-2003-502874, Journal of Applied Physics, vol. 92, p. 5295 (2002) can be enumerated as such know document.

SUMMARY OF THE INVENTION

The present invention has been made in view of the above circumstances and provides a carbon fine particle structure capable of attaining high capability as a semiconductor material with the convenience in production process maintained, and a process for producing the same.

The invention also provides materials suitable for producing the aforementioned carbon fine particle structure having high usefulness, specifically, to provide a carbon fine particle transcriptional body and a solution for producing a carbon fine particle structure.

The invention further provides an electronic device (carbon fine particle structure electronic device) with high capability and a large area capable of being produced in a convenient process by using the aforementioned carbon fine particle structure having high usefulness; and an integrated circuit obtained by integrating the aforementioned electronic devices having high capability.

According to a first aspect of the invention, a carbon fine particle structure includes: a plurality of carbon fine particles having a graphite structure; and a crosslinked part including a chemical bond of a plurality of functional groups bonded to the plurality of carbon fine particles, the chemical bond at least connecting one end of one of the carbon fine particles to another one of the fine particles, in which the plurality of the carbon fine particles and the crosslinked part constitute a network structure.

According to a second aspect of the invention, a method for producing a carbon fine particle structure, includes: applying a plurality of carbon fine particles each having a graphite structure and having a functional group bonded thereto to a surface of a base body; and crosslinking the functional groups with a chemical bond to form a crosslinked part, so as to form a carbon fine particle structure having a network structure comprising the plurality of carbon fine particles connected to each other.

According to a third aspect of the invention, a method for producing a carbon fine particle structure, the process includes: coating a solution containing carbon fine particles having a graphite structure and each having a functional group bonded thereto on a surface of a preliminary substrate; crosslinking the functional groups with a chemical bond to form a crosslinked part, so as to form a carbon fine particle structure layer having a network structure comprising the plurality of carbon fine particles crosslinked to each other; patterning the carbon fine particle structure layer into a desired shape; and transferring the patterned carbon fine particle structure layer from the surface of the preliminary substrate to a first base body.

According to a fourth aspect of the invention, a carbon fine particle transcriptional body includes: a preliminary substrate; and a carbon fine particle structure layer on a surface of the preliminary substrate. A carbon fine particle structure layer includes a plurality of carbon fine particles having a graphite structure; and a crosslinked part including a chemical bond of a plurality of functional groups bonded to the plurality of carbon fine particles. The chemical bond at least connects one end of one of the carbon fine particles to another one of the fine particles. The carbon fine particle structure layer has a network structure with the plurality of the carbon fine particles and the crosslinked part. The carbon fine particle transcriptional body being capable of transferring the carbon fine particle structure layer in a desired form to a base body. The preliminary substrate is removed from the base body upon transferring the carbon fine particle structure layer to the base body.

According to a fifth aspect of the invention, a solution for producing a carbon fine particle structure, includes at least a plurality of carbon fine particles having a graphite structure and each having a functional group bonded thereto, and a solvent.

According to a sixth aspect of the invention, a carbon fine particle structure electronic device includes a base body; and a carbon fine particle structure layer on a surface of the base body in a prescribed pattern. The carbon fine particle structure layer includes a plurality of carbon fine particles having a graphite structure; and a crosslinked part including a chemical bond of a plurality of functional groups bonded to the plurality of carbon fine particles. The chemical bond at least connects one end of one of the carbon fine particles to another one of the fine particles. The carbon fine particle structure layer has a network structure with the plurality of the carbon fine particles and the crosslinked part.

According to a seventh aspect of the invention, a carbon fine particle structure electronic device includes: a base body; at least three electrodes formed on sites on the base body; and a transporting layer which is formed on the surface of the base body. The transporting layer transports a carrier corresponding to a voltage applied to the electrodes, comprises a plurality of carbon fine particles having a graphite structure; and a crosslinked part including a chemical bond of a plurality of functional groups bonded to the plurality of carbon fine particles. The chemical bond at least connects one end of one of the carbon fine particles to another one of the fine particles. The transporting layer has a network structure with the plurality of the carbon fine particles and the crosslinked part.

According to an eighth aspect of the invention, a method for producing a carbon fine particle structure electronic device including a base body; at least three electrodes formed on sites on the base body; and a transporting layer which is formed on the surface of the base body, the method includes: applying a plurality of carbon fine particles having a graphite structure and each having a functional group bonded thereto to the surface of the base body; and crosslinking the functional groups with a chemical bond to form a crosslinked part, so as to form a carbon fine particle structure having a network structure comprising the plurality of carbon fine particles crosslinked to each other. The transporting layer transports a carrier corresponding to a voltage applied to the electrodes, and comprises a plurality of carbon fine particles having a graphite structure; and a crosslinked part including a chemical bond of a plurality of functional groups bonded to the plurality of carbon fine particles. The chemical bond at least connects one end of one of the carbon fine particles to another one of the fine particles. The transporting layer has a network structure with the plurality of the carbon fine particles and the crosslinked part.

According to a ninth aspect of the invention, a method for producing a carbon fine particle structure electronic device including a first base body; at least three electrodes formed on sites on the base body; and a transporting layer which is formed on the surface of the base body, includes: coating a solution containing carbon fine particles having a graphite structure and each having a functional group bonded thereto to a surface of a preliminary substrate; crosslinking the functional groups with a chemical bond to form a crosslinked part, so as to form a carbon fine particle structure layer having a network structure comprising the plurality of carbon fine particles crosslinked to each other; patterning the carbon fine particle structure layer into a desired shape; and transferring the patterned carbon fine particle structure layer from the surface of the preliminary substrate to the first base body. The transporting layer transports a carrier corresponding to a voltage applied to the electrodes, and comprises a plurality of carbon fine particles having a graphite structure; and a crosslinked part including a chemical bond of a plurality of functional groups bonded to the plurality of carbon fine particles. The chemical bond at least connects one end of one of the carbon fine particles to another one of the fine particles. The transporting layer has a network structure with the plurality of the carbon fine particles and the crosslinked part.

According to a tenth aspect of the invention, an integrated circuit includes a base body; and a plurality of electronic devices on a surface of the base body. The electronic device includes a carbon fine particle structure layer patterned in a prescribed shape. The carbon fine particle structure layer includes a plurality of carbon fine particles having a graphite structure; and a crosslinked part including a chemical bond of a plurality of functional groups bonded to the plurality of carbon fine particles. The chemical bond at least connects one end of one of the carbon fine particles to another one of the fine particles. The carbon fine particle structure layer has a network structure with the plurality of the carbon fine particles and the crosslinked part.

DETAILED DESCRIPTION OF THE PREFERRED EMBODIMENTS

Figure 1:
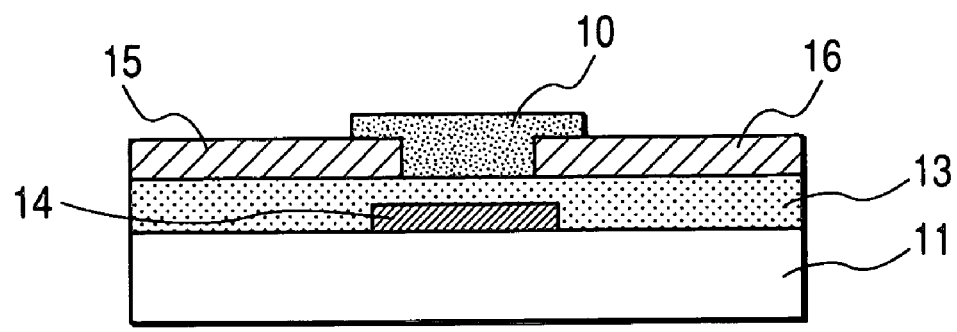
FIG. 1 is a schematic cross sectional view showing an example of a MOS-FET type thin film transistor as an embodiment of the invention.

The invention provides the following embodiments (1) to (67).

(1) A carbon fine particle structure containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure.

In the carbon fine particle structure of the item (1), the carbon fine particles constitute a network structure with the crosslinked part by forming a chemical bond of the functional groups bonded to the carbon fine particles, whereby the size of the crosslinked part for bonding the carbon fine particles becomes constant depending on the species of the functional groups to be bonded. The significantly stable chemical structure of the carbon fine particles lowers the possibility of forming a bond by other parts on the carbon fine particles than the functional group to be bonded, and thus the crosslinked part can have a designed structure by chemically bonding the functional groups to obtain a uniform carbon fine particle structure.

The carbon fine particle structure of the item (1) forms a network structure containing the plural carbon fine particles bonded through the plural crosslinked parts, and thus the excellent characteristics of the carbon fine particles can be stably utilized, as being different from such a conventional material that the carbon fine particles are incidentally in contact with each other but are in a substantially isolated state, such as a simple dispersed film of carbon fine particles or a resin dispersed film thereof.

(2) The carbon fine particle structure according to the item (1), in which the carbon fine particles are carbon black.

(3) The carbon fine particle structure according to the item (1), in which the carbon fine particles are graphite fine powder.

(4) The carbon fine particle structure according to the item (1), in which the crosslinked part is formed by curing plural carbon fine particles having a graphite structure and having a functional group bonded thereto with a crosslinking agent capable of undergoing a crosslinking reaction with the functional group, through a crosslinking reaction between the functional group of the carbon fine particles and the crosslinking agent.

(5) The carbon fine particle structure according to the item (4), in which the crosslinked part has a crosslinked structure containing residual groups of the functional groups remaining after the crosslinking reaction, the residual groups being connected through a connecting group having a hydrocarbon skeleton.

In this embodiment, the connecting group preferably has a hydrocarbon skeleton having from 2 to 10 carbon atoms.

(6) The carbon fine particle structure according to the item (4), in which the crosslinked part contains one chemical structure selected from the group consisting of —COO $(CH_2)_2$OCO—, —COOCH$_2$CHOHCH$_2$OCO—, —COOCH$_2$CH(OCO—) CH$_2$OH, —COOCH$_2$CH(OCO—) CH$_2$OCO— and —COO—C$_6$H$_4$—COO—. The length of the aforementioned bonds is extremely shorter than the carbon fine particles, whereby the distance between the carbon fine particles at the crosslinked part can be made significantly short, and as a result, the density of the carbon fine particles in the carbon fine particle structure is increased to facilitate formation of electric paths. Consequently, the electronic device can be stably operated with a transporting layer with a reduced size, or in alternative, the amount of the electric current capable of flowing in the transporting layer can be increased. In particular, the use of the crosslinked part having a structure of —COO—C$_6$H$_4$—COO— is preferred since the electric characteristics are stabilized with small time-lapse deterioration.

(7) The carbon fine particle structure according to the item (1), in which the crosslinked part contains a chemical bond obtained by reacting the same or different functional groups with each other, the plural carbon fine particles having the functional groups.

In the embodiment of the item (7), the functional groups having been bonded to the carbon fine particles are bonded to each other, whereby an electronic device using the carbon fine particle structure thus obtained can have desired characteristics. The length of the crosslinked part obtained by chemically bonding the functional groups can be smaller than that in the case where the functional groups are crosslinked by using a crosslinking agent, whereby a dense carbon fine particle structure can be obtained to facilitate exhibition of the characteristics inherent to the carbon fine particles.

(8) The carbon fine particle structure according to the item (7), in which the crosslinked part contains at least one chemical structure selected from the group consisting of —COOCO—, —O—, —NHCO—, —COO—, —NCH—, —NH—, —S—, —N HCOO— and —S—S—.

The crosslinked part having the aforementioned structure is preferred because of the same reasons as in the embodiment of the item (6).

(9) A process for producing a carbon fine particle structure, the process containing steps of: applying plural carbon fine particles having a graphite structure and each having a functional group bonded thereto to a surface of a base body; and crosslinking the functional groups through a chemical bond for forming a crosslinked part, so as to form a carbon fine particle structure having a network structure containing the plural carbon fine particles crosslinked to each other.

A conventional structure obtained by aggregating carbon fine particles to make them in contact with each other to obtain the effect of mutual interaction among the carbon fine particles cannot be patterned unless the structure is bound with a resin or the like since the aggregated body having not been bound is scattered upon patterning. Upon binding the conventional structure with a resin, the coating operation of the resin flows the carbon fine particles, and the resin penetrates into the contact part between the carbon fine particles to lose the connection, whereby the carbon fine particles are in an isolated state in the resin and cannot be utilized as such a structure that exhibits the excellent characteristics of the carbon fine particles.

In the case where a dispersion liquid having carbon fine particles having been dispersed in a resin solution is coated, stable connection among the carbon fine particles cannot be attained unless the concentration of the carbon fine particles in the solution is significantly increased, which is a problem before patterning the structure.

In the invention, a solution containing carbon fine particles each having a functional group (hereinafter, sometimes referred to as a crosslinking solution) is fed to the whole surface or a part of the surface of the base body or into a desired mold, in the applying step. In the subsequent crosslinking step, the solution thus fed is cured to form a carbon fine particle structure having a network structure containing the plural carbon fine particles crosslinked to each other. The carbon fine particle structure on the surface of the base body is stabilized through the aforementioned two steps.

The solution may be coated on the substrate, and in this case, the carbon fine particle structure having the network structure can be obtained in a layer form, which facilitates the patterning into a desired shape described later.

(10) The process for producing a carbon fine particle structure according to the item (9), in which the applying step contains a step of applying a crosslinking agent for crosslinking the functional group to the surface of the base body. The crosslinking reaction between the functional groups with a crosslinking agent in the process of this embodiment is hereinafter referred to as a first process.

(11) The process for producing a carbon fine particle structure according to the item (10), in which the crosslinking agent is a non-self-polymerizable crosslinking agent.

In the case where the crosslinking agent has such a nature that it undergoes a polymerization reaction by itself (self-polymerizable nature) as the characteristics thereof, there is such a possibility that the connecting group contains a polymer containing two or more molecules of the crosslinking agent connected to each other, which lowers the substantial density of the carbon fine particles in the carbon fine particle structure, and thus there are some cases where the carbon fine particle structure cannot exert the semiconductor capability as a transporting layer.

In the case where the crosslinking agent is of non-self-polymerizable nature, the distance between the carbon fine particles can be controlled to the size of the reaction product of the crosslinking reaction of the functional group and the crosslinking agent, whereby the target network structure of carbon fine particles can be obtained with high reproducibility. In the case where the size of the residual group of the crosslinking agent remaining after the reaction is reduced, furthermore, the distance between the carbon fine particles can be reduced to obtain such a state that they are electrically and physically proximate to each other. Moreover, the carbon fine particles in the structure can be densely structuralized, whereby a minute electronic device can be produced, and the amount of electric current capable of flowing in the transporting layer can be increased.

The term "self-polymerizable nature" referred herein means that the crosslinking agent has such a nature that it suffers mutual polymerization reaction in the presence of other components, such as water, or in the presence of no other component, and the term "non-self-polymerizable nature referred herein means such a nature that the crosslinking agent does not have the nature.

(12) The process for producing a carbon fine particle structure according to the item (10), in which the functional group is at least one selected from the group consisting of —OH, —COOH, —COOR (wherein R represents a substituted or unsubstituted hydrocarbon group), —COX (wherein X represents a halogen atom), —NH$_2$ and —NCO, and the crosslinking agent is a crosslinking agent capable of undergoing a crosslinking reaction with the functional group selected.

(13) The process for producing a carbon fine particle structure according to the item (12), in which the crosslinking agent is at least one selected from the group consisting of a polyol, a polyamine, a polycarboxylic acid, a polycarboxylate ester, a polycarboxylic acid halide, a polycarbodiimide and a polyisocyanate, and the functional group is a functional group capable of undergoing a crosslinking reaction with the crosslinking agent selected.

In particular, it is preferred that the process for producing a carbon fine particle structure has both the features of the items (12) and (13), i.e., it is preferred that the functional group is at least one selected from the group consisting of —OH, —COOH, —COOR (wherein R represents a substituted or unsubstituted hydrocarbon group), —COX (wherein X represents a halogen atom), —NH$_2$ and —NCO, the crosslinking agent is at least one selected from the group consisting of a polyol, a polyamine, a polycarboxylic acid, a polycarboxylate ester, a polycarboxylic acid halide, a polycarbodiimide and a polyisocyanate, and the functional group and the crosslinking agent are selected to make a combination capable of undergoing a mutual crosslinking reaction.

(14) The process for producing a carbon fine particle structure according to the item (10), in which the functional group is —COOH or —COOR (wherein R represents a substituted or unsubstituted hydrocarbon group).

A carboxyl group can be relatively easily introduced into the carbon fine particles, and the resulting material (i.e., a carbon fine particle carboxylic acid) can be relatively easily esterified to have a functional group —COOR (wherein R represents a substituted or unsubstituted hydrocarbon group) owing to the high reactivity thereof. The functional group thus obtained easily undergoes a crosslinking reaction and is suitable for forming a coated film.

(15) The process for producing a carbon fine particle structure according to the item (13), in which the crosslinking agent is a polyol.

A polyol easily forms a firm crosslinked body by curing through reaction with the group —COOR (wherein R represents a substituted or unsubstituted hydrocarbon group). Among the polyols, glycerol and ethylene glycol not only have high reactivity with the functional group, but also have high biodegradability to exert low environmental load.

(16) The process for producing a carbon fine particle structure according to the item (14), in which the crosslinking agent is at least one selected from the group consisting of glycerol, ethylene glycol, butenediol, hexynediol, hydroquinone and naphthalenediol.

(17) The process for producing a carbon fine particle structure according to the item (9), in which a reaction for forming the chemical bond is a reaction for chemically bonding the plural functional groups. The crosslinking reaction between the functional groups in the process of this embodiment is hereinafter referred to as a second process.

In this embodiment, in the case where the functional groups form a chemical bond, the distance between the carbon fine particles can be controlled even when the carbon fine particles are crosslinked by chemically bonding different kinds of functional groups, whereby a uniform structure can be similarly obtained. The skeleton of the network structure of the carbon fine particles after the reaction is in such a state that the distance between the carbon fine particles is controlled, and thus it is possible to increase the density of the network structure by crosslinking other functional groups than those having contributed to the reaction between the functional groups and a part of the bonds formed from the functional groups after the reaction by using a crosslinking agent. The crosslinking agent used after forming the skeleton of the network structure may be a self-polymerizable crosslinking agent that is crosslinked by itself or a non-self-polymerizable crosslinking agent that is not crosslinked by itself.

(18) The process for producing a carbon fine particle structure according to the item (17), in which the applying step contains a step of applying an additive for forming the chemical bond of the functional groups to the surface of the base body.

In the case where the reaction of chemically bonding the functional groups utilizes a condensation reaction or a substitution reaction, the use of the additive is basically essential, and in the case where an oxidation reaction is utilized, an oxidation reaction accelerating agent is preferably used. In an addition reaction, the use of a reaction accelerating agent may not be essential.

(19) The process for producing a carbon fine particle structure according to the item (18), in which the reaction is a dehydration condensation reaction, and the additive is a condensing agent.

It is preferred in this embodiment that the condensing agent is at least one selected from the group consisting of sulfuric acid, N-ethyl-N'-(3-dimethylaminopropyl)carbodiimide and dicyclohexylcarbodiimide, and the functional group is at least one selected from the group consisting of —COOR (wherein R represents a substituted or unsubstituted hydrocarbon group), —COOH, —COX (wherein X represents a halogen atom), —OH, —CHO and —$NH_2$, and particularly preferably —COOH.

A carboxyl group can be relatively easily introduced into the carbon fine particles, and the resulting material (i.e., a carbon fine particle carboxylic acid) has high reactivity. Therefore, it is preferred for forming a coated film because the functional groups for constituting the network structure can be easily introduced to plural sites on one carbon fine particle, and the functional groups easily undergo a condensation reaction.

(20) The process for producing a carbon fine particle structure according to the item (18), in which the reaction is a substitution reaction, and the additive is a base.

It is preferred in this embodiment that the base is at least one selected from the group consisting of sodium hydroxide, potassium hydroxide, pyridine and sodium ethoxide, and the functional group is at least one selected from the group consisting of —$NH_2$, —X (wherein X represents a halogen atom), —SH, —OH, —$OSO_2CH_3$ and —$OSO_2(C_6H_4)CH_3$.

(21) The process for producing a carbon fine particle structure according to the item (18), in which the reaction is an addition reaction.

It is preferred in this embodiment that the functional group is —OH and/or —NCO.

(22) The process for producing a carbon fine particle structure according to the item (18), in which the reaction is an oxidation reaction.

It is preferred in this embodiment that the functional group is —SH.

It is also possible that molecules having the preferred functional groups described in the items (19) to (22) are bonded to the carbon fine particles, and the functional groups are chemically bonded to constitute the crosslinked part.

(23) The process for producing a carbon fine particle structure according to the item (22), in which the additive is an oxidation reaction accelerating agent.

It is preferred in this embodiment that the oxidation reaction accelerating agent is iodine.

(24) The process for producing a carbon fine particle structure according to the item (9), in which the applying step contains a step of applying a solution containing the plural carbon fine particles each having a functional group bonded thereto, and a solvent.

By using the carbon fine particles each having a functional group bonded thereto, the crosslinked amount is controlled, and the density of the carbon fine particles and the forming amount of the crosslinked part in the carbon fine particle structure can be uniform. Accordingly, such a problem can be reduced that the characteristics of the electronic devices thus integrated are fluctuated depending on locations on the carbon fine particle structure. In the case where isolated carbon fine particles are tried to be crosslinked directly with a chemical bond for forming a carbon fine particle structure having a network structure, they are substantially not crosslinked or the graphene sheet structure on the surface of the carbon fine particles is totally broken, and thus an intended network structure is difficultly obtained.

(25) The process for producing a carbon fine particle structure according to the item (24), in which the solution further contains a crosslinking agent for crosslinking the functional groups bonded to the plural carbon fine particles.

The combination of the functional group and the crosslinking agent capable of forming the crosslinked structure can be selected, and thus the chemical bond constituting the crosslinked part can have a desired structure to obtain an electronic device having desired characteristics.

(26) The process for producing a carbon fine particle structure according to the item (25), in which the crosslinking agent functions as a solvent.

(27) The process for producing a carbon fine particle structure according to the item (24), in which the solution further contains an additive for forming the chemical bond of the functional groups bonded to the plural carbon fine particles.

(28) The process for producing a carbon fine particle structure according to the item (24), in which the applying step contains a step of coating the solution on the surface of the substrate to form a layer, and the layer is transformed into a carbon fine particle structure layer through the crosslinking step.

(29) The process for producing a carbon fine particle structure according to the item (28), in which the process further contains a step of patterning the carbon fine particle structure layer into a desired shape.

In this stage, the structure of the carbon fine particle structure layer is stabilized through the crosslinking step, and the patterning step in that state can provide a pattern corresponding to the desired shape with no problem, such as scattering of the carbon fine particles upon pattering. The film of the carbon fine particle structure layer itself is structuralized, and thereby the connections among the carbon fine particles are ensured to provide such a carbon fine particle structure that utilizes the characteristics of the carbon fine particles.

Furthermore, the carbon fine particle structure layer thus obtained is uniform in the crosslinked part to provide the uniform overall characteristics, and therefore, even in the case where the layer is miniaturized by patterning in the pattering step, fluctuation in characteristics of the carbon fine particle structure layer thus patterned can be greatly reduced.

(30) The process for producing a carbon fine particle structure according to the item (29), in which the patterning step contains a step of removing the carbon fine particle structure layer on the surface of the base body in an area except for a pattern corresponding to the desired shape by dry etching, so as to pattern the carbon fine particle structure layer into the pattern corresponding to the desired shape.

(31) The process for producing a carbon fine particle structure according to the item (29), in which the patterning step contains steps of forming a resist layer on the carbon fine particle structure layer on the surface of the base body in an area of a pattern corresponding to the desired shape; and removing the carbon fine particle structure layer exposed in an area except for the pattern by dry etching on the surface of the base body having the carbon fine particle structure layer and the resist layer accumulated thereon.

It is preferred in this embodiment that the surface of the base body having the carbon fine particle structure layer and the resist layer accumulated thereon is irradiated with a radical of an oxygen molecule, and it is also preferred that an oxygen molecule is irradiated with an ultraviolet ray to generate an oxygen radical, which is used as the radical to be irradiated onto the surface of the base body having the carbon fine particle structure layer and the resist layer accumulated thereon.

The resist layer is preferably a resin layer.

(32) The process for producing a carbon fine particle structure according to the item (31), in which the patterning step further contains, subsequent to the removing step, a step of removing the resist layer provided in the resist layer forming step.

(33) The process for producing a carbon fine particle structure according to the item (29), in which the patterning step contains a step of removing the carbon fine particle structure layer on the surface of the base body in an area except for a pattern corresponding to the desired shape by selectively irradiating the area with an ion beam of an ion of a gas molecule, so as to pattern the carbon fine particle structure layer into the desired shape.

(34) A process for producing a carbon fine particle structure, the process containing steps of: coating a solution containing at least carbon fine particles having a graphite structure and each having a functional group bonded thereto on a surface of a preliminary substrate; crosslinking the functional groups through a chemical bond for forming a crosslinked part, so as to form a carbon fine particle structure layer having a network structure containing the plural carbon fine particles crosslinked to each other; patterning the carbon fine particle structure layer into a desired shape; and transferring the patterned carbon fine particle structure layer from the surface of the preliminary substrate to a base body.

This embodiment is an example of a useful application of the process for producing a carbon fine particle structure according to the invention. In this application example, the base body in the process for producing a carbon fine particle structure is replaced by a preliminary substrate, and after once patterning the carbon fine particle structure layer on the surface of the preliminary substrate, the carbon fine particle structure layer is then transferred to a target base body.

In the invention, a target material, on which the patterned carbon fine particle structure layer is to be formed, is referred to as a "base body". Therefore, a material, on which the patterned carbon fine particle structure layer is temporarily (provisionally) formed, is referred to as a "preliminary substrate".

(35) The process for producing a carbon fine particle structure according to the item (34), in which the base body is a substrate having at least one of flexibility and softness.

In the case where the base body is a substrate having at least one of flexibility and softness, the base body can be deformed upon use corresponding to the application mode of the resulting carbon fine particle structure.

It is particularly effective for the aforementioned application example of the process for producing a carbon fine particle structure that a rigid substrate is used as the preliminary substrate, and a substrate having flexibility or softness is used as the base body. In alternative, it is possible in the transferring step that the patterned carbon fine particle structure layer is transferred to an intermediate transfer material having flexibility or softness, and then further transferred to the base body having a desired surface conformation or the base body capable of being deformed (for example, flexibility, elasticity or bendability).

(36) The process for producing a carbon fine particle structure according to the item (34), in which the process further contains, subsequent to the transferring step, a step of fixing the patterned carbon fine particle structure layer transferred to the base body, onto a second base body along with the base body.

In the transferring step of the embodiment of the item (34), it is possible that the patterned carbon fine particle structure layer on the surface of the preliminary substrate is once transferred to a surface of an intermediate transfer material, and the carbon fine particle structure layer thus transferred to the surface of the intermediate transfer material is then transferred to the base body.

In this case, the crosslinking step may contain a step of heating the carbon fine particle structure layer formed on the surface of the preliminary substrate to a temperature lower than the melting point of the preliminary substrate but equal to or higher than the melting point or the glass transition point of the intermediate transfer material for curing the solution after coating. In alternative, the patterning step may be such a step that the carbon fine particle structure layer in an area except for the desired shape on the preliminary substrate is removed by carrying out dry etching to the area, so as to pattern the carbon fine particle structure layer into the desired shape, in which the intermediate transfer material has no resistance to the dry etching carried out in the patterning step, but the preliminary substrate has resistance thereto.

In the embodiment of the item (34), the crosslinking step may contain a step of heating the carbon fine particle structure layer formed on the surface of the preliminary substrate to a temperature lower than the melting point of the preliminary substrate but equal to or higher than the melting point or the glass transition point of the base body for curing the solution after coating.

In the embodiment of the item (34), the patterning step may be such a step that the carbon fine particle structure layer in an area except for the desired shape on the preliminary substrate is removed by carrying out dry etching to the area, so as to pattern the carbon fine particle structure layer into the desired shape.

It is possible in this case that the base body has no resistance to the dry etching carried out in the patterning step, but the preliminary substrate has resistance thereto.

In other words, even in the case where the base body, on which the carbon fine particle structure layer is to be formed, has no resistance to dry etching carried out in the patterning step, the dry etching operation can be carried out with no problem by applying the aforementioned application example using a material having resistance to the dry etching as the preliminary substrate, so as to produce appropriately the carbon fine particle structure of the invention.

The aforementioned application example is effective in such a case that the crosslinking step contains a step of heating the carbon fine particle structure layer formed on the surface of the preliminary substrate to a temperature lower than the melting point of the preliminary substrate but equal to or higher than the melting point or the glass transition point of the base body (the intermediate transfer material if used) for curing the solution after coating. In other words, even in the case where the base body, on which the carbon fine particle structure layer is to be formed, is formed of a material having a low melting point or a low glass transition point, the heating operation in the crosslinking step can be carried out at a temperature lower than the melting point of the preliminary substrate but equal to or higher than the melting point or the glass transition point of the base body, so as to produce appropriately the carbon fine particle structure of the invention.

In the embodiment of the item (34), the solution may contain a crosslinking agent for crosslinking the functional groups, and in this case, the crosslinking agent is preferably a non-self-polymerizable crosslinking agent. In this case, it is preferred that the functional group is —COOH or —COOR (wherein R represents a substituted or unsubstituted hydrocarbon group), and the corresponding crosslinking agent is a polyol.

In the embodiment of the item (34), the reaction of forming the chemical bond may be a reaction for chemically bonding the plural functional groups to each other, and the solution may contain an additive for forming the chemical bond among the functional groups. The additive may be at least one selected from the group consisting of a condensing agent, a base and an oxidation reaction accelerating agent. In the case where the reaction for forming the chemical bond is a reaction for chemically bonding the plural functional groups to each other, the functional group is preferably at least one selected from the group consisting of —COOR (wherein R represents a substituted or unsubstituted hydrocarbon group), —COOH, —COX (wherein X represents a halogen atom), —OH, —CHO, —NH$_2$, —X (wherein X represents a halogen atom), —SH, —OSO$_2$CH$_3$, —OSO$_2$(C$_6$H$_4$)CH$_3$ and —NCO.

(37) The process for producing a carbon fine particle structure according to the item (34), in which the patterning step contains steps of: forming a resist layer on the carbon fine particle structure layer on the surface of the preliminary substrate in an area of the desired shape; and removing the carbon fine particle structure layer exposed in an area except for the pattern by making the surface of the base body having the carbon fine particle structure layer and the resist layer accumulated thereon in contact with an etching solution.

In this embodiment, it is possible that the base body has no resistance to the etching solution used in the patterning step, and the preliminary substrate has resistance thereto. It is also possible that the intermediate transfer material has no resistance to the etching solution used in the patterning step, and the preliminary substrate has resistance thereto.

In other words, even in the case where the base body or the intermediate transfer material, on which the carbon fine particle structure layer is to be formed, is formed of a material having no resistance to the etching solution used in the patterning step, the etching solution can be used with no problem by applying the aforementioned application example of the invention and using a material having resistance to the etching solution as the preliminary substrate, so as to produce appropriately the carbon fine particle structure of the invention. Accordingly, the aforementioned application example is effective for the case where the base body (the intermediate transfer material if used) has no resistance to the etching solution used in the patterning step, but the preliminary substrate has resistance thereto.

In the case where the patterning step is necessarily carried out to form a minute pattern, it is preferred that patterning is carried out on the preliminary substrate by such a method as etching as having been described, and as another method, such a method may be employed that the carbon fine particle structure layer is cut along with the preliminary substrate into a desired shape, and after attaching to the base body, the preliminary substrate is removed. The carbon fine particle structure layer obtained in any of these methods constitutes a network structure formed by crosslinking the carbon fine particles, whereby the connection among the carbon fine particles can be surely formed, and there is less possibility of breakage upon transferring to base bodies having various shapes owing to the tough and flexible nature of the carbon fine particles, so as to maintain the good connection among the carbon fine particles after transferring.

(38) A carbon fine particle transcriptional body containing a preliminary substrate having carried on a surface thereof a carbon fine particle structure layer containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure, the carbon fine particle transcriptional body being capable of transferring the carbon fine particle structure layer in a desired form to a base body, the preliminary substrate being removed from the base body upon transferring the carbon fine particle structure layer to the base body.

Upon producing a carbon fine particle structure, the aforementioned carbon fine particle transcriptional body can be used in such a manner that a carbon fine particle structure layer constituting a network structure is formed on a surface of a preliminary substrate, and then the layer is patterned corresponding to a desired device and transferred to a base body, which is to be a part of the device, followed by removing the preliminary substrate. By using the carbon fine particle transcriptional body, a carbon fine particle structure can be easily produced without carrying out the crosslinking step on the surface of the substrate. The carbon fine particles are carried on the preliminary substrate in a crosslinked state, so as to provide convenient handleability.

Examples of the method of removing the preliminary substrate include a physical method, such as detachment, and a chemical method, such as decomposition, burning out, melting, sublimation and dissolution.

Upon producing the carbon fine particle transcriptional body, the carbon fine particle structure layer may be formed by crosslinking on the preliminary substrate, or in alternative, it is possible that a layer obtained by crosslinking on another base body is transferred to an intermediate transfer material, and the intermediate transfer material is used as the preliminary substrate to constitute the carbon fine particle transcriptional body.

According to the carbon fine particle transcriptional body of the invention, the patterned carbon fine particle structure can be transferred even in the case where the preliminary substrate has flexibility or softness, or the base body has a complex surface conformation.

In the embodiment of the item (38), the carbon fine particle structure layer may contain a crosslinked part formed through crosslinking reaction of the functional group bonded to the carbon fine particles and a crosslinking agent capable of undergoing crosslinking reaction with the functional group, so as to constitute a network structure. It is preferred that the crosslinked part has such a structure that the residual groups of the functional groups remaining after the crosslinking reaction are connected through a connecting group having a hydrocarbon skeleton, and it is also preferred that the connecting group has a hydrocarbon skeleton having from 2 to 10 carbon atoms. Specifically, the crosslinked part preferably has one chemical structure selected from the group consisting of —COO($CH_2$)$_2$OCO—, —COOCH$_2$CHOHCH$_2$OCO—, —COOCH$_2$CH(OCO—)CH$_2$OH and —COOCH$_2$CH(OCO—)CH$_2$OCO—.

In the embodiment of the item (38), the carbon fine particle structure layer may contain a crosslinked part formed through crosslinking reaction of the functional groups bonded to the carbon fine particles, so as to constitute a network structure, and it is preferred that the crosslinked part is at least one chemical structure selected from the group consisting of —COOCO—, —O—, —NHCO—, —COO— and —NCH—.

It is preferred in the embodiment of the item (38) that the preliminary substrate has flexibility or softness.

(39) A solution for producing a carbon fine particle structure, the solution containing at least plural carbon fine particles having a graphite structure and each having a functional group bonded thereto, and a solvent.

By using the solution for producing a carbon fine particle structure of the invention, a carbon fine particle structure having a uniform network structure can be produced with considerably good handleability.

(40) The solution for producing a carbon fine particle structure according to the item (39), in which the solution further contains a crosslinking agent for crosslinking the functional groups bonded to the plural carbon fine particles.

It is preferred in this embodiment that the crosslinking agent is a non-self-polymerizable crosslinking agent.

It is preferred that the functional group is at least one selected from the group consisting of —OH, —COOH, —COOR (wherein R represents a substituted or unsubstituted hydrocarbon group), —COX (wherein X represents a halogen atom), —NH$_2$ and —NCO, and the crosslinking agent is a crosslinking agent capable of undergoing a crosslinking reaction with the functional group selected. It is also preferred that the crosslinking agent is at least one selected from the group consisting of a polyol, a polyamine, a polycarboxylic acid, a polycarboxylate ester, a polycarboxylic acid halide, a polycarbodiimide and a polyisocyanate, and the functional group is a functional group capable of undergoing a crosslinking reaction with the crosslinking agent selected. It is further preferred that the functional group and the crosslinking agent are selected from the preferred examples of the functional group and the preferred examples of the crosslinking agent, respectively.

Among these, the functional group is preferably —COOH or —COOR (wherein R represents a substituted or unsubstituted hydrocarbon group), and the crosslinking agent is a polyol, and particularly preferably at least one selected from the group consisting of glycerol, ethylene glycol, butenediol, hexynediol, hydroquinone and naphthalenediol.

(41) The solution for producing a carbon fine particle structure according to the item (40), in which the crosslinking agent functions as a solvent.

(42) The solution for producing a carbon fine particle structure according to the item (39), in which the solution further contains an additive for forming a chemical bond of the functional groups bonded to the plural carbon fine particles.

In this embodiment, the additive may be previously mixed in the solution, or may be mixed therewith immediately before using.

(43) The solution for producing a carbon fine particle structure according to the item (42), in which the additive is at least one of a condensing agent, a base and an oxidation reaction accelerating agent.

In the case where a condensing agent is contained as the additive, the condensing agent is preferably at least one selected from the group consisting of sulfuric acid, N-ethyl-N'-(3-dimethylaminopropyl)carbodiimide and dicyclohexylcarbodiimide, and the functional group is at least one selected from the group consisting of —COOR (wherein R represents a substituted or unsubstituted hydrocarbon group), —COOH, —COX (wherein X represents a halogen atom), —OH, —CHO and —NH$_2$, and particularly preferably —COOH.

In the case where a base is contained as the additive, the base is preferably at least one selected from the group consisting of sodium hydroxide, potassium hydroxide, pyridine and sodium ethoxide, and the functional group is at least one selected from the group consisting of —NH$_2$, —X (wherein x represents a halogen atom), —SH, —OH, —OSO$_2$CH$_3$ and —OSO$_2$(C$_6$H$_4$)CH$_3$.

In the case where an oxidation reaction accelerating agent is contained as the additive, the oxidation reaction accelerating agent is preferably iodine, and the functional group is preferably —SH.

In the embodiment of the item (39), furthermore, the use of —SH as the functional group can produce such a solution for producing a carbon fine particle structure that the functional groups can be directly crosslinked through an addition reaction.

(44) A carbon fine particle structure electronic device containing a base body having on a surface thereof a carbon fine particle structure layer in a prescribed pattern, the carbon fine particle structure layer containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure.

The carbon fine particle structure electronic device of the invention described in the item (44) (hereinafter, sometimes simply referred to as an electronic device of the invention) uses, as a layer functioning as a transporting layer, a carbon fine particle structure layer containing plural carbon fine particles and a crosslinked part crosslinking among different carbon fine particles to form a network structure, whereby the electronic device can be operated stably in comparison to the case using a simple dispersed film of carbon fine particles as a transporting layer, without such a problem that the contact state and the arrangement state of the carbon fine particles become instable to lose or fluctuate the electric path.

The electric path referred herein means a conduction path of a carrier (such as a positive hole and an electron) transported in a transporting layer. The electric path may not always conduct a carrier through the crosslinked part, but such a case may be included that a carrier is conducted by the tunnel effect owing to the sufficiently short length of the crosslinked part.

While it has been known that carbon fine particles has metal-like electric characteristics, it has been found in the carbon fine particle structure of the invention that it also functions as a transporting layer. Although the reason therefor is not clear, the results indicating the phenomena will be shown in the examples described later. It can be estimate that the crosslinked part functions as a structure like a Schottky barrier while being unclear. Apart from the reasons, it has been found that a transporting layer can be formed by using carbon fine particles, which can be mass-produced with high purity and can be easily handled, whereby an active device having carbon fine particles applied thereto can be easily mass-produced industrially.

The principal of carrier conduction has not yet been established not only in the carbon fine particle structure having a network structure but also in a carbon fine particle dispersed material. Therefore, there is such a possibility in future that an appropriate explanation is provided for the phenomena occurring in the products of the invention, but it is apparent that the usefulness of the electronic device obtained by the constitution of the invention is not affected thereby.

(45) A carbon fine particle structure electronic device containing a base body, three or more electrodes formed on sites on the base body, and a transporting layer formed on the surface of the base body, the transporting layer transporting a carrier corresponding to a voltage applied to the electrodes, the transporting layer containing a carbon fine particle structure containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure.

The embodiment of the item (45) is an example of a specific embodiment as an electronic device of the embodiment described in the item (44).

It is preferred in the embodiment of the item (45) that the crosslinked part is one chemical structure selected from the group consisting of —COO($CH_2$)$_2$OCO—, —COOCH$_2$CHOHCH$_2$OCO—, —COOCH$_2$CH(OCO—)CH$_2$OH and —COOCH$_2$CH(OCO—)CH$_2$OCO—.

It is also preferred that the crosslinked part is at least one chemical structure selected from the group consisting of —COOCO—, —O—, —NHCO—, —COO—, —NCH—, —NH—, —S—, —N HCOO— and —S—S—.

The transporting layer may be the carbon fine particle structure that is patterned to a shape corresponding to the forming area of the transporting layer.

(46) A carbon fine particle structure electronic device according to the item (45), wherein the electrodes contains at least a source electrode, a drain electrode and a gate electrode to constitute a field effect transistor structure.

Other electrodes than these electrodes may also be provided, and for example, plural gate electrodes may be provided. The gate electrode may be provided on an upper surface or a lower surface of the transporting layer, and also not only may be provided in a planar form but also provided three-dimensionally to cover the transporting layer for increasing the gate voltage.

(47) The carbon fine particle structure electronic device according to the item (46), in which the field effect transistor structure is a MOS-FET structure.

In the case where a MOS-FET (metal oxide semiconductor field effect transistor) structure is employed as the field effect transistor, the operation power can be reduced, and good switching characteristics can be obtained, whereby a highly integrated device can be effectively constituted.

(48) The carbon fine particle structure electronic device according to the item (45), in which the crosslinked part has a crosslinked structure containing residual groups of the functional groups remaining after the crosslinking reaction, the residual groups being connected through a connecting group having a hydrocarbon skeleton.

It is preferred in this embodiment that the connecting group has a hydrocarbon skeleton having from 2 to 10 carbon atoms.

(49) The carbon fine particle structure electronic device according to the item (45), in which the crosslinked part contains a chemical bond obtained by reacting the same or different functional groups with each other, the plural carbon fine particles having the functional groups.

(50) The carbon fine particle structure electronic device as claimed in claim 45, in which the base body is a flexible base body (a base body having flexibility or softness).

In the case where an electronic device having, as a transporting layer, the carbon fine particle structure containing carbon fine particles and a crosslinked part crosslinking among them through a chemical bond to form a network structure is formed on a flexible substrate, the electronic device can be prevented from suffering characteristic change caused by change of the electric path associated with bending of the substrate, which cannot be avoided in an electronic device having a conventional transporting layer using mutual contact of carbon fine particles.

(51) A process for producing a carbon fine particle structure electronic device containing a base body, three or more electrodes formed on sites on the base body, and a transporting layer formed on the surface of the base body, the transporting layer transporting a carrier corresponding to a voltage applied to the electrodes, the transporting layer containing a carbon fine particle structure containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure, the process containing a step of forming the transporting layer on the surface of the base body, the transporting layer forming step containing steps of: applying at least plural carbon fine particles having a graphite structure and each having a functional group bonded thereto to the surface of the base body; and crosslinking the functional groups through a chemical bond for forming a crosslinked part, so as to form a carbon fine particle structure having a network structure containing the plural carbon fine particles crosslinked to each other.

It has been found that in the case where three electrodes are disposed on the carbon fine particle structure containing carbon fine particles crosslinked with the crosslinked part through a chemical bond to form a network structure, and one of the three electrode is used as a control electrode, in the process for producing a carbon fine particle structure electronic device of the invention, characteristics equivalent to a semiconductor device can be obtained with carbon fine particles, which are high in productivity and availability. Accordingly, the carbon fine particle structure can be patterned after structuralizing into a network structure capable of being stably patterned, whereby such an electronic device can be assuredly and effectively obtained that does not depend on incidental contact of the carbon fine particles, and can be patterned to a minute pattern, which is difficult to be attained by the layer depending on incidental contact. The production process of the invention is excellent in productivity and is suitable for producing a top-down type integrated circuit, in comparison to the conventional process, and thus such an innovative process can be provided that realizes a highly integrated device using carbon fine particles, which is being highly demanded.

(52) The process for producing a carbon fine particle structure electronic device according to the item (51), in which the applying step contains a step of applying a solution containing the plural carbon fine particles each having a functional group bonded thereto, and a solvent.

(53) The process for producing a carbon fine particle structure electronic device according to the item (52), in which the applying step contains a step of coating the solution on the surface of the base body to form a layer, and the layer is transformed into a carbon fine particle structure layer through the crosslinking step.

(54) The process for producing a carbon fine particle structure electronic device according to the item (52), in which the solution further contains a crosslinking agent for crosslinking the functional groups bonded to the plural carbon fine particles.

It is preferred in this embodiment that the crosslinking agent is a non-self-polymerizable crosslinking agent, and the functional group is —COOH or —COOR (wherein R represents a substituted or unsubstituted hydrocarbon group). It is particularly preferred that the crosslinking agent is a polyol.

(55) The process for producing a carbon fine particle structure electronic device according to the item (54), in which the crosslinking agent functions as a solvent.

In this embodiment, an additive for forming the chemical bond of the functional groups may be fed to the surface of the base body. Examples of the additive include one selected from the group consisting of a condensing agent, a base and an oxidation reaction accelerating agent.

In the embodiment of the item (55), examples of the functional group include at least one selected from the group consisting of —COOR (wherein R represents a substituted or unsubstituted hydrocarbon group), —COOH, —COX (wherein X represents a halogen atom), —OH, —CHO, —$NH_2$, —X (wherein X represents a halogen atom), —$OSO_2CH_3$, —$OSO_2(C_6H_4)CH_3$ and —NCO.

(56) The process for producing a carbon fine particle structure electronic device according to the item (51), in which a reaction for forming the chemical bond is a reaction for chemically bonding the plural functional groups.

In this embodiment, an additive for forming the chemical bond of the functional groups may be fed to the surface of the base body. In the embodiment of the item (52), in which the solution containing the various components is fed to the surface of the base body, the following embodiment of the item (57) may be employed.

(57) The process for producing a carbon fine particle structure electronic device according to the item (52), in which the solution further contains an additive for forming the chemical bond of the functional groups.

In this embodiment, the additive may be one selected from the group consisting of a condensing agent, a base and an oxidation reaction accelerating agent.

In the embodiment of the item (56), examples of the functional group include at least one selected from the group consisting of —COOR (wherein R represents a substituted or unsubstituted hydrocarbon group), —COOH, —COX (wherein X represents a halogen atom), —OH, —CHO, —$NH_2$, —X (wherein X represent a halogen atom), —$OSO_2CH_3$, —$OSO_2$ $(C_6H_4)$ $CH_3$ and —NCO.

(58) The process for producing a carbon fine particle structure electronic device according to the item (53), in which the process further contains a step of patterning the carbon fine particle structure layer into a shape corresponding to the transporting layer.

The carbon fine particle structure electronic device of the invention having a transporting layer obtained by patterning the carbon fine particle structure into a shape corresponding to the forming area of the transporting layer can be operated stably without losing an electronic path in the pattern owing to the carbon fine particles chemically bonded through the crosslinked part. Furthermore, the carbon fine particle structure having a network structure through the crosslinked part through a chemical bond has an overall uniform structure as being different from a carbon fine particle dispersed film using incidental contact, whereby the characteristics of the transporting layer suffers small fluctuation in characteristics depending on the locations of the carbon fine particle structure before patterning, and thus the electronic devices obtained after patterning also suffer small fluctuation in characteristics.

(59) The process for producing a carbon fine particle structure electronic device according to the item (58), in which the patterning step contains a step of removing the carbon fine particle structure layer on the surface of the base body in an area except for a pattern corresponding to the transporting layer by dry etching, so as to pattern the carbon fine particle structure layer into the pattern corresponding to the transporting layer.

(60) The process for producing a carbon fine particle structure electronic device according to the item (58), in which the patterning step contains steps of: forming a resist layer on the carbon fine particle structure layer on the surface of the base body in an area of a pattern corresponding to the transporting layer; and removing the carbon fine particle structure layer exposed in an area except for the pattern by dry etching on the surface of the base body having the carbon fine particle structure layer and the resist layer accumulated thereon.

It is possible in this embodiment that the surface of the base body having the carbon fine particle structure layer and the resist layer accumulated thereon may be irradiated with a radical of an oxygen molecule. In this case, it is also possible that an oxygen molecule is irradiated with an ultraviolet ray to generate an oxygen radical, which is used as the radical to be irradiated onto the surface of the base body having the carbon fine particle structure layer and the resist layer accumulated thereon.

(61) The process for producing a carbon fine particle structure electronic device according to the item (60), in which the patterning step further contains, subsequent to the removing step, a step of removing the resist layer provided in the resist layer forming step.

It is preferred in this embodiment that the resist layer is a resin layer.

(62) The process for producing a carbon fine particle structure electronic device according to the item (58), in which the patterning step contains a step of removing the carbon fine particle structure layer on the surface of the base body in an area except for a pattern corresponding to the transporting layer by selectively irradiating the area with an ion beam of an ion of a gas molecule, so as to pattern the carbon fine particle structure layer into the transporting layer.

(63) A process for producing a carbon fine particle structure electronic device containing a base body, three or more electrodes formed on sites on the base body, and a transporting layer formed on the surface of the base body, the transporting layer transporting a carrier corresponding to a voltage applied to the electrodes, the transporting layer containing a carbon fine particle structure containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure, the process containing a step of forming the transporting layer on the surface of the base body, the transporting layer forming step containing steps of:

coating a solution containing at least carbon fine particles having a graphite structure and each having a functional group bonded thereto to a surface of a preliminary substrate; crosslinking the functional groups through a chemical bond for forming a crosslinked part, so as to form a carbon fine particle structure layer having a network structure containing the plural carbon fine particles crosslinked to each other; patterning the carbon fine particle structure layer into a desired shape; and transferring the patterned carbon fine particle structure layer from the surface of the preliminary substrate to a base body.

(64) The process for producing a carbon fine particle structure electronic device according to the item (63), in which the base body comprising a substrate having at least one of flexibility or softness.

(65) The process for producing a carbon fine particle structure electronic device according to the item (63), in which the process further contains, subsequent to the transferring step, a step of fixing the patterned carbon fine particle structure transferred to the base body, onto a second base body along with the base body.

It is preferred in the embodiment of the item (63) that the transferring step preferably contains steps of: once transferring the patterned carbon fine particle structure layer on the surface of the preliminary substrate, to a surface of an intermediate transfer material; and transferring the carbon fine particle structure layer thus transferred to the surface of the intermediate transfer material, to the base body.

In the embodiment of the item (63), the crosslinking step may contain a step of heating the carbon fine particle structure layer formed on the surface of the preliminary substrate to a temperature lower than the melting point of the preliminary substrate and equal to or higher than the melting point or the glass transition point of the base body for curing the solution after coating, and the crosslinking step may also contain a step of heating the carbon fine particle structure layer formed on the surface of the preliminary substrate to a temperature lower than the melting point of the preliminary substrate and equal to or higher than the melting point or the glass transition point of the intermediate transfer material for curing the solution after coating.

It is preferred in the embodiment of the item (63) that the patterning step contains a step of removing the carbon fine particle structure layer on the surface of the preliminary substrate in an area except for a pattern corresponding to the desired shape by dry etching on the area, so as to pattern the carbon fine particle structure layer into the pattern corresponding to the desired shape, and it is possible in this case that the base body has no resistance to the dry etching in the patterning step, but the preliminary substrate has resistance thereto.

It is possible in the embodiment of the item (63) that the patterning step contains a step of removing the carbon fine particle structure layer on the surface of the preliminary substrate in an area except for a pattern corresponding to the desired shape by dry etching on the area, so as to pattern the carbon fine particle structure layer into the pattern corresponding to the desired shape, and that the intermediate transfer material has no resistance to the dry etching in the patterning step, but the preliminary substrate has resistance thereto.

It is possible in the embodiment of the item (63) that the patterning step contains steps of: forming a resist layer on the carbon fine particle structure layer on the surface of the preliminary substrate in an area of the desired shape; and removing the carbon fine particle structure layer exposed in an area except for the pattern by making the surface of the preliminary substrate having the carbon fine particle structure layer and the resist layer accumulated thereon in contact with an etching solution, and that the intermediate transfer material has no resistance to the etching solution used in the patterning step, but the preliminary substrate has resistance thereto.

It is possible in the embodiment of the item (63) that the solution contains a crosslinking agent for crosslinking the functional groups, and the crosslinking agent is preferably a non-self-polymerizable crosslinking agent. In this case, it is preferred that the functional group is —COOH or —COOR (wherein R represents a substituted or unsubstituted hydrocarbon group), and the corresponding crosslinking agent is a polyol.

It is possible in the embodiment of the item (63) that the reaction of forming the chemical bond is a reaction for chemically bonding the plural functional groups to each other. The solution may contain an additive for forming the chemical bond among the functional groups, and examples of the additive include a condensing agent, a base and an oxidation reaction accelerating agent. In this embodiment, the functional group is preferably at least one selected from the group consisting of —COOR (wherein R represents a substituted or unsubstituted hydrocarbon group), —COOH, —COX (wherein X represents a halogen atom), —OH, —CHO, —NH$_2$, —X (wherein X represents a halogen atom), —OSO$_2$CH$_3$, —OSO$_2$(C$_6$H$_4$)CH$_3$ and —NCO.

(66) The process for producing a carbon fine particle structure electronic device according to the item (63), in which the patterning step contains steps of: forming a resist layer on the carbon fine particle structure layer on the surface of the preliminary substrate in an area of the desired shape; and removing the carbon fine particle structure layer exposed in an area except for the pattern by making the surface of the preliminary substrate having the carbon fine particle structure layer and the resist layer accumulated thereon in contact with an etching solution.

It is possible in this embodiment that the base body has no resistance to the etching solution used in the patterning step, but the preliminary substrate has resistance thereto.

(67) An integrated circuit containing a base body having integrated on a surface thereof plural electronic devices, each of the electronic devices containing a carbon fine particle structure layer patterned in a prescribed shape, the carbon fine particle structure layer containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure.

According to the invention, a carbon fine particle structure having uniform characteristics, and thereby an electronic device or the like using carbon fine particles can be stably produced. As a result, even in the case where the resulting carbon fine particle structure is finely processed, such as patterning and cutting, fluctuation in characteristics depending on patterns and locations is suppressed to provide an electronic device and an integrated circuit having stable electric characteristics, whereby an electronic device and an integrated circuit with uniform characteristics can be effectively produced.

The carbon fine particle structure and the process for producing the same, and the electronic device and the process for producing the same will be separately described in detail below.

[Carbon Fine Particle Structure]

The carbon fine particle structure of the invention contains plural carbon fine particles having a graphite structure and a crosslinked part containing plural functional groups chemically bonded to each other, and at least one ends of each of the functional groups are connected to different carbon fine particles, whereby the plural carbon fine particles and the crosslinked part constitute a network structure. The carbon-fine particle structure is mainly formed as a layer on a surface of a substrate.

In the case where the carbon fine particle structure is formed as a layer, the surface of the base body may have other layers formed thereon than the carbon fine particle structure layers. Other electric wiring and electronic parts may also be formed thereon.

(Base Body)

The base body referred herein means a target, on which the carbon fine particle structure is to be formed. The base body herein may be a member, to which a mixed liquid (crosslinking solution) of carbon fine particles modified with a functional group and a necessary additive is fed for forming the carbon fine particle structure, or may be a member for constituting, as a substrate, a part of a device using the carbon fine particle structure. The base body used in the invention is not limited to those having a flat shape but may include those having any surface conformation including a spherical surface, a curved surface, an uneven surface and an irregular surface.

Upon forming the carbon fine particle structure as a layer, there are various cases depending on the shape of the base body, e.g., a case where the carbon fine particle structure layer can be patterned directly on the surface of the base body, a case where the patterned carbon fine particle structure layer is used in such a manner that the layer is attached to a second base body along with the base body, and a case where only the patterned carbon fine particle structure layer is transferred thereto.

The material for the base body is not particularly limited, and not only various materials having been used as a substrate of an electronic device (such as a silicon wafer and a zinc oxide substrate), but also various kinds of resin materials and inorganic materials may be used without any problem. A substrate having an insulating surface is generally used, but a substrate having no insulating surface (e.g., a conductor or a semiconductor) may also be used depending on the function of the carbon fine particle structure layer formed thereon.

In the case where the carbon fine particle structure of the invention is provided on a substrate having flexibility or softness, in particular, it can be produced easily as described later, and furthermore, there is less possibility that the carbon fine particle structure layer formed on the surface of the substrate is broken upon bending or deforming the substrate because the carbon fine particle structure has the crosslinked-structure, so as to suppress deterioration of the capability of the device due to deformation. In particular, the carbon fine particle structure has uniform characteristics owing to the functional groups chemically bonded to each other. Examples of the substrate having flexibility or softness include various kinds of resin substrate, such as polyethylene, polypropylene, polyvinyl chloride, polyamide and polyimide.

(Carbon Fine Particle Structure and Carbon Fine Particle Structure Layer)

As having been described, the carbon fine particle structure of the invention contains plural carbon fine particles having a graphite structure and a crosslinked part containing plural functional groups chemically bonded to each other, at least one ends of each of the functional groups are connected to different carbon fine particles, and the plural carbon fine particles and the crosslinked part constitute a network structure. The carbon fine particle structure layer in the invention is the carbon fine particle structure formed in a layer form. The carbon fine particle structure may be produced by any process as far as the layer of carbon fine particles can be constituted to have a network structure crosslinked through chemical bonds of the functional groups, and according to the process for producing a carbon fine particle structure according the invention described later, a carbon fine particle structure exhibiting high performance can be obtained at low cost with the characteristics thereof being easily uniformized and controlled.

The carbon fine particle structure layer used as a carbon fine particle structure produced by the process for producing a carbon fine particle structure according to the invention is obtained by curing the carbon fine particles each having a functional group along with a solution (crosslinking solution) containing an additive for chemically bonding the functional groups, which is added depending on necessity, to form the crosslinked part through reaction of the functional groups of the carbon fine particles.

The carbon fine particle structure of the invention will be described below with reference to an example of the production process.

The carbon fine particles used in the invention have a graphite structure. The graphite structure herein means such a structure that network structures each containing continuous 6-membered rings of carbon atoms (graphene sheets) in a two-dimensional plane are accumulated in parallel to each other.

Therefore, such cases are not included in the graphite structure that no regular structure is formed, a regular non-6-membered ring stricture, such as a 5-membered or 7-membered structure, is formed, and a graphene sheet necessarily has curvature.

Specifically, for example, carbon black and fine particles of graphite are included in the carbon fine particles having a graphite structure in the invention, and a carbon nanotube and a fullerene are not included therein. Amorphous carbon is also not included in the carbon fine particles having a graphite structure of the invention, but such amorphous carbon that has intermediate nature, i.e., partly has a graphite structure, is included therein. However, unless a graphite structure is present over the fine particles, the fine particles totally become an insulating material, whereby sufficient conduction of an electron or a positive hole cannot be obtained. Therefore, it is preferred to use carbon black, fine particles of graphite or a mixture thereof.

The carbon fine particles preferably have a diameter of from 1 nm to 10 μm. In the case where the particle diameter of the carbon fine particles exceeds the range, the carbon fine particles are difficult to be produced, and it is not preferred from the standpoint of cost. The particle diameter of the carbon fine particles is more preferably 1 μm or less.

The lower limit of the particle diameter of the carbon fine particles is generally about 1 nm from the standpoint of the structure thereof. There are some cases where the yield upon synthesis thereof is disadvantageously lowered when it is too small, and the particle diameter thereof is preferably 5 nm or more, and more preferably 10 nm or more.

With respect to the species of the carbon fine particles, the particle diameter is preferably from 10 to 500 nm for carbon black, and is preferably about from 0.1 to several micrometers (more preferably from 0.1 to 1 μm) for graphite.

The content of the carbon fine particles in the crosslinking solution cannot be determined unconditionally since it depends on the length and the thickness of the carbon fine particles, the structure thereof (e.g., a single layer structure and a multilayer structure), the kind and the amount of the functional group, the kind and the amount of the crosslinking agent, the presence or absence, the kind and the amount of the solvent and other additives. The content of the carbon fine particles is preferably such a high concentration that a coated film in good condition can be obtained after curing, but is preferably not too high to prevent the coating property from being deteriorated.

While it cannot be determined unconditionally as having been described, the specific proportion of the carbon fine particles is generally from 0.01 to 10 g/L, preferably from 0.1 to 5 g/L, and more preferably from 0.5 to 1.5 g/L, without the mass of the functional group, based on the total amount of the coating solution.

In the case where the carbon fine particles to be used has a low purity, it is preferred that the carbon fine particles are purified to improve the purity before preparing the crosslinking solution. The purity of the carbon fine particles in the invention is preferably as high as possible, and specifically the purity is preferably 90% or more, and more preferably 95% or more. In the case where the purity is too low, there are some cases where functional groups, such as carboxylic acid, bonded to carbon products, such as amorphous carbon and tar, as impurities are bonded to the carbon fine particles to fluctuate the crosslinking distance among the carbon fine particles, whereby the desired characteristics cannot be obtained. The purifying method of the carbon fine particles is not particularly limited, and the methods having been known in the art can be employed.

The carbon fine particles are added with a prescribed functional group, and then used for producing the carbon fine particle structure. Preferred examples of the functional group to be added are different depending on the case where the carbon fine particle structure is produced by the first process or the case where the carbon fine particle structure is produced by the second process. The functional group in the former case is referred to as a functional group 1, and that in the later case is referred to as a functional group 2.

The functional group bonded to the carbon fine particles in the invention is not particularly limited, and any kind of functional groups may be used, as far as the functional group can be chemically added to the carbon fine particles, and the functional groups can be reacted to each other with a crosslinking agent or a certain additive or without addition thereof.

The method for introducing the functional group to the carbon fine particles will be described later for the preparation method of the crosslinking solution.

The constitutional components that can be used for forming the carbon fine particle structure will be described for the first process and the second process, separately.

(First Process)

In the first process of forming the crosslinked part by using a crosslinking agent, the functional group bonded to the carbon fine particles is not particularly limited, and any kind of functional groups may be used, as far as the functional group can be chemically added to the carbon fine particles, and the functional groups can undergo a crosslinking reaction with a certain crosslinking agent. Specific examples of the functional group include —COOR, —COX, —MgX, —X (wherein X represents a halogen atom), —OR, —NR$^1$R$^2$, —NCO, —NCS, —COOH, —OH, —NH$_2$, —SH, —SO$_3$H, —R'CHOH, —CHO, —CN, —COSH, —SR and —SiR'$_3$ (wherein R, R$^1$, R$^2$ and R' each independently represents a substituted or unsubstituted hydrocarbon group), but the invention is not limited to them.

Among these, it is preferred to select at least one group selected from the group consisting of —OH, —COOH, —COOR (wherein R represents a substituted or unsubstituted hydrocarbon group), —COX (wherein X represents a halogen atom), —NH$_2$ and —NCO, and in this case, such a crosslinking agent is selected that is capable of undergoing a crosslinking reaction with the functional group selected.

In particular, —COOH and —COOR (wherein R represents a substituted or unsubstituted hydrocarbon group) are particularly preferred because a carboxyl group can be relatively easily introduced to the carbon fine particles, the substance obtained thereby (i.e., carbon fine particle carboxylic acid) can be easily esterified to introduce the functional group, and these functional groups have high reactivity with the crosslinking agent.

The substituted or unsubstituted hydrocarbon group represented by R in the functional group —COOR is not particularly limited, and it is preferably an alkyl group having from 1 to 10 carbon atoms, more preferably an alkyl group having from 1 to 5 carbon atoms, and particularly preferably a methyl group or an ethyl group, from the standpoint of the reactivity, the solubility, the viscosity and the usability as a solvent for the coating solution.

The amount of the functional group introduced cannot be determined unconditionally since it depends on the particle diameter of the carbon fine particles, the kind of the functional group, and the purpose of the carbon fine particle structure, and it is preferably such an amount that two or more functional groups are attached to one carbon fine particle from the standpoint of the strength of the resulting crosslinked product, i.e., the strength of the coated film. The method for introducing the functional group to the carbon fine particles will be described later for the production process of the carbon fine particle structure.

(Crosslinking Agent)

The crosslinking agent is essential in the first process. Any kind of crosslinking agents may be used that undergo a crosslinking reaction with the functional group bonded to the carbon fine particles. In other words, the kind of the crosslinking agent that can be selected is limited to a certain extent depending on the kind of the functional group. The curing conditions (e.g., heating, ultraviolet ray irradiation, visible light irradiation and spontaneous curing) are inevitably determined by the combination thereof.

Preferred examples of the crosslinking agent include a polyol, a polyamine, a polycarboxylic acid, a polycarboxylate ester, a polycarboxylic acid halide, a polycarbodiimide, a polyisocyanate and hydroquinone, and at least one crosslinking agent selected from the group consisting of them is preferably selected. In this case, such a functional group is selected that is capable of undergoing a crosslinking reaction with the crosslinking agent selected.

In particular, it is preferred that at least one functional group and at least one crosslinking agent are selected from the group exemplified as the preferred functional groups and the group exemplified as the preferred crosslinking agents, respectively, in such a manner that the functional group selected and the crosslinking agent selected are capable of undergoing a crosslinking reaction with each other. Examples of the combinations of the functional group bonded to the carbon fine particles and the crosslinking agent capable of undergoing a crosslinking reaction therewith are shown in Table 1 below along with the curing conditions therefor.

TABLE 1

| Functional group bonded to carbon fine particles | Crosslinking agent | Curing condition |
|---|---|---|
| —COOR | polyol | heat curing |
| —COX | polyol | heat curing |
| —COOH | polyamine | heat curing |
| —COX | polyamine | heat curing |
| —OH | polycarboxylate ester | heat curing |
| —OH | polycarboxylic acid halide | heat curing |
| —NH2 | polycarboxylic acid | heat curing |
| —NH2 | polycarboxylic acid halide | heat curing |
| —COOH | polycarbodiimide | heat curing |
| —OH | polycarbodiimide | heat curing |
| —NH2 | polycarbodiimide | heat curing |
| —NCO | polyol | heat curing |
| —OH | polyisocyanate | heat curing |
| —COOH | ammonium complex | heat curing |
| —COOH | hydroquinone | heat curing |

R: substituted or unsubstituted hydrocarbon group
X: halogen atom

Among these combinations, preferred examples thereof include a combination of —COOR (wherein R represents a substituted or unsubstituted hydrocarbon group), which are good in reactivity, and a polyol. The polyol referred in the invention is a generic designation of compounds having two or more hydroxyl groups, and among these, a compound having from 2 to 10 carbon atoms (more preferably from 2 to 5 carbon atoms) and having from 2 to 22 hydroxyl groups (more preferably from 2 to 5 hydroxyl groups) is preferred from the standpoint of the crosslinking property, the applicability to a solvent upon dissolving an excessive amount, the processability by biodegradation of a waste solution after the reaction (i.e., the environmental applicability), and the yield of the polyol synthesis. In particular, the number of carbon atoms is preferably as small as possible within the aforementioned range, since in the case where the number of carbon atoms is small, the distance between the carbon fine particles is shortened to realize the substantial contact state (proximate state) of the carbon fine particles. Specifically, glycerol and ethylene glycol are preferred, and one or both of them are preferably used as the crosslinking agent.

The crosslinking agent is preferably a non-self-polymerizable crosslinking agent from another point of view. Glycerol and ethylene glycol as having been exemplified as the polyol are non-self-polymerizable crosslinking agents, and in more general concept, the non-self-polymerizable crosslinking agent does not have such a functional group that causes a polymerization reaction therein. In other words, a self-polymerizable crosslinking-agent has a combination of functional groups causing a polymerization reaction therein, such as an alkoxide.

The content of the crosslinking agent in the crosslinking solution cannot be determined unconditionally since it depends on the kinds of the crosslinking agent (including as to whether it is self-polymerizable or non-self-polymerizable), the particle diameter and the size of the carbon fine particles, the kind and the amount of the functional group used, the presence or absence, the kind and the amount of the solvent and other additives. In particular, glycerol and ethylene glycol can be added in an excessive amount since they have a low viscosity and thus can also be used as a solvent.

A solvent may be added to the crosslinking solution in the case where the coating applicability is insufficient only with the crosslinking agent. The solvent that can be used is not particularly limited, and can be selected depending on the kind of the crosslinking agent used. Specific examples thereof include an organic solvent, such as methanol, ethanol, isopropanol, n-propanol, butanol, methyl ethyl ketone, toluene, benzene, acetone, chloroform, methylene chloride, acetonitrile, diethyl ether and tetrahydrofuran (THF), water, an acid aqueous solution, and an alkali aqueous solution. The addition amount of the solvent is not particularly limited and may be appropriately determined under consideration of the coating applicability.

(Second Process)

In the second process, in which the plural functional groups are chemically bonded directly to each other without a crosslinking agent to form the crosslinked part, the functional group is not particularly limited, and any kind of functional groups may be used, as far as the functional group can be chemically added to the carbon fine particles, and the functional groups can be reacted with each other in the presence of a certain additive. Specific examples of the functional group include —COOR, —COX, —MgX, —X (wherein X represents a halogen atom), —OR, —NR$^1$R$^2$, —NCO, —NCS, —COOH, —OH, —NH$_2$, —SH, —SO$_3$H, —R'CHOH, —CHO, —CN, —COSH, —SR and —SiR'$_3$ (wherein R, R$^1$, R$^2$ and R' each independently represents a substituted or unsubstituted hydrocarbon group), but the invention is not limited to them.

Preferred examples of the reaction for chemically bonding the functional groups include a dehydration condensation reaction, a substitution reaction, an addition reaction and an oxidation reaction. Preferred examples of the functional group for these reactions include at least one selected from —COOR (wherein R represents a substituted or unsubstituted hydrocarbon group), —COOH, —COX (wherein X represents a halogen atom), —OH, —CHO and —NH$_2$ for the condensation reaction, at least one selected from —$NH_2$, —X (wherein X represents a halogen atom), —SH, —OH, —$SO_2CH_3$ and —$OSO_2(C_6H_4)CH3$ for the substitution reaction, at least one selected from —OH and —NCO for the addition reaction, and —SH for the oxidation reaction.

It is also possible that a molecule having the functional group as a part thereof is bonded to the carbon fine particles, which are then chemically bonded to each other at the part of the functional group. In this case, also, the functional group having a large molecular weight is bonded to the carbon fine particles in the intended manner, and thus the length of the crosslinked part can be controlled.

Upon chemically bonding the functional groups, an additive for forming the chemical bond between the functional groups may be used. Any kind of additives may be used as far as the additives undergo a reaction between the functional groups. In other words, the kind of the additive that can be selected is limited to a certain extent depending on the kind of the functional group. The curing conditions (e.g., heating, ultraviolet ray irradiation, visible light irradiation and spontaneous curing) are inevitably determined by the combination thereof.

In the case where the reaction for chemically bonding the functional groups is a dehydration condensation reaction, a condensing agent is preferably added as the additive. Preferred examples of the condensing agent include sulfuric acid, N-ethyl-N'-(3-dimethylaminopropyl)carbodiimide and dicyclohexylcarbodiimide, and at least one selected from the group consisting of them is preferably selected. In this case, such a functional group is selected that is capable of undergoing a crosslinking reaction in the presence of the additive selected.

The functional group used in the dehydration condensation reaction is preferably at least one selected from the group consisting of —COOR (wherein R represents a substituted or unsubstituted hydrocarbon group), —COOH, —COX (wherein X represents a halogen atom), —OH, —CHO and —$NH_2$.

The functional group used in the dehydration condensation reaction is particularly preferably —COOH. A carboxyl group can be relatively easily introduced to the carbon fine particles, and the substance obtained thereby (i.e., carbon fine particle carboxylic acid) has high reactivity. Therefore, the functional group for forming the network structure can be easily introduced to plural sites on one carbon fine particle, and the functional group thus introduced easily undergoes the dehydration condensation reaction, so as to provide good applicability to the formation of the carbon fine particle structure. In the case where the functional group used in the dehydration condensation reaction is —COOH, particularly preferred examples of the condensing agent include sulfuric acid, N-ethyl-N'-(3-dimethylaminopropyl) carbodiimide and dicyclohexylcarbodiimide, as having been described.

In the case where the reaction for chemically bonding the functional groups is a substitution reaction, a base is preferably added as the additive. The base that can be added is not particularly limited and can be arbitrarily selected depending on the acidity of the hydroxyl group. Preferred examples of the base include sodium hydroxide, potassium hydroxide, pyridine and sodium ethoxide, and at least one selected from the group consisting of them is preferably selected. In this case, such a functional group is selected that is capable of undergoing a crosslinking reaction in the presence of the base selected. The functional group in this case is preferably at least one selected from the group consisting of —$NH_2$, —X (wherein X represents a halogen atom), —SH, —OH, —$OSO_2CH_3$ and —$OSO_2(C_6H_4)CH_3$.

In the case where the reaction for chemically bonding the functional groups is an addition reaction, the additive is not necessarily used. The functional group in this case is preferably —OH and/or —NCO.

In the case where the reaction for chemically bonding the functional groups is an oxidation reaction, the additive is not necessarily used, and an oxidation reaction accelerating agent is preferably used as the additive. Examples of the oxidation reaction accelerating agent added include iodine. The functional group in this case is preferably —SH.

It is preferred that two functional groups are selected from the groups as exemplified as preferred functional groups and bonded to the carbon fine particles in such a manner that the two functional groups can undergo a reaction with each other. Examples of the functional groups (A) and (B) bonded to the carbon fine particles and the corresponding reaction are shown in Table 2 below.

TABLE 2

| Crosslinked part | Functional group (A) bonded to carbon fine particles | Functional group (B) bonded to carbon fine particles | Reaction |
|---|---|---|---|
| —COOCO— | —COOH | — | dehydration condensation |
| —S—S— | —SH | — | oxidation |
| —O— | —OH | — | dehydration condensation |
| —NH—CO— | —COOH | —$NH_2$ | dehydration condensation |
| —COO— | —COOH | —OH | dehydration condensation |
| —COO— | —COOR | —OH | dehydration condensation |
| —COO— | —COX | —OH | dehydration condensation |
| —CH=N— | —CHO | —$NH_2$ | dehydration condensation |
| —NH— | —$NH_2$ | —X | substitution |
| —S— | —SH | —X | substitution |
| —O— | —OH | —X | substitution |
| —O— | —OH | —$OSO_2CH_3$ | substitution |
| —O— | —OH | —$OSO_2(C_6H_4)CH_3$ | substitution |
| —NH—COO— | —OH | —N=C=O | addition |

R: substituted or unsubstituted hydrocarbon group
X: halogen atom

Upon forming the carbon fine particle structure layer, plural carbon fine particles each having the functional group and, depending on necessity, the additive may be fed to the surface of the base body (the applying step in the process for producing a carbon fine particle structure of the invention), and the functional groups may be chemically bonded to each other to form the crosslinked part (the crosslinking step in the process for producing a carbon fine particle structure of the invention). Upon applying the plural carbon fine particles each having the functional group are fed to the surface of the base body, it is preferred in the case where the carbon fine particle structure of the invention is formed to a thin layer that a solution (crosslinking solution) containing the carbon fine particles and a solvent is fed to the surface of the base body, and it is particularly preferred that the solution is coated thereon as a coating solution to form a crosslinked film.

The content of the additive in the crosslinking coating solution cannot be determined unconditionally since it depends on the kind of the additive, the particle diameter of the carbon fine particles, the kind and the amount of the functional group bonded thereto, the presence or absence, the kind and the amount of the other additives.

A solvent may be added to the crosslinking solution in the case where the coating applicability is insufficient only with the additive for crosslinking the functional groups. The solvent that can be used is not particularly limited, and can be selected depending on the kind of the additive used. Specific examples the solvent include those described for the first process.

(Other Additives)

In the crosslinking solution (including those for the first process and the second process), various kinds of additives may be contained, such as a viscosity adjusting agent, a dispersing agent and a crosslinking accelerating agent.

A viscosity adjusting agent may be added in the case where the coating applicability is insufficient only with the crosslinking agent or the additive for crosslinking the functional groups. The viscosity adjusting agent that can be used is not particularly limited, and can be selected depending on the kind of the crosslinking agent. Specific examples thereof include methanol, ethanol, isopropanol, n-propanol, butanol, methyl ethyl ketone, toluene, benzene, acetone, chloroform, methylene chloride, acetonitrile, diethyl ether and THF.

The viscosity adjusting agent includes those functioning as a solvent depending on the addition amount thereof, and there is no significance in clearly distinguishing them. The addition amount of the viscosity adjusting agent is not particularly limited and can be appropriately determined under consideration of the coating applicability.

A dispersing agent may be added for maintaining dispersion stability of the carbon fine particles and the crosslinking agent or the additive for crosslinking the functional groups in the crosslinking solution, and various kinds of a surfactant, a water soluble organic solvent, water, an acid aqueous solution and an alkali aqueous solution may be used. However, the dispersing agent may not be necessarily used since the components of the crosslinking solution have high dispersion stability by themselves. Furthermore, there are some cases where it is desired that the resulting crosslinked film does not contain any impurity, such as the dispersing agent, depending on the purpose of the crosslinked film, and in these cases, the dispersing agent is not added or added in an amount as small as possible.

(Preparation Method of Crosslinking Solution)

A preparation method of the crosslinking solution will be described.

The crosslinking solution can be prepared by mixing the carbon fine particles each having a functional group with the crosslinking agent undergoing a crosslinking reaction with the functional group or the additive for chemically bonding the functional groups depending on necessity (mixing step). Prior to the mixing step, an adding step of introducing the functional group to the carbon fine particles may be effected.

In the case where carbon fine particles each having a functional group are used as a starting material, only the operation of the mixing step is carried out, and in the case where ordinary carbon fine particles are used as a starting material, the adding step is carried out prior to the mixing step.

The adding step is to introduce a desired functional group to carbon fine particles. The method for introducing the functional group cannot be determined unconditionally since it varies depending on the kind of the functional group. It is possible for obtaining the target functional group that such a functional group that can be easily introduced is once introduced, and then the functional group or a part thereof is substituted, or another functional group is further added to the functional group having been introduced.

It is also possible that a mechanochemical force is applied to the carbon fine particles to broken or modify a part of the graphene sheet on the surface of the carbon fine particles, and various kinds of a functional group is introduced thereto.

The operation of the adding step is not particularly limited, and any known method may be used. Examples of various methods that can be used are disclosed in the JP-A-2001-94107, which can also be used in the invention depending on purposes.

A method for introducing —COOR (wherein R represents a substituted or unsubstituted hydrocarbon group), which is particularly preferred, will be described. Upon introducing —COOR (wherein R represents a substituted or unsubstituted hydrocarbon group) into the carbon fine particles, (i) a carboxyl group is once introduced to the carbon fine particles, and then (ii) the hydroxyl group is esterified.

(i) Addition of Carboxyl Group

A carboxyl group can be introduced to carbon fine particles by refluxing with an acid having oxidizing property. The operation is relatively simple and is preferred since a carboxyl group having high reactivity can be introduced. The operation will be briefly described.

Examples of the acid having oxidizing property include concentrated nitric acid, a hydrogen peroxide solution, a mixed solution of sulfuric acid and nitric acid, and aqua regia. In the case where concentrated nitric acid is used, in particular, the concentration thereof is preferably 5% by mass or more, and more preferably 60% by mass or more.

The refluxing may be carried out by the ordinary method, and the temperature therefor is preferably around the boiling point of the acid. For example, a temperature of from 120 to 130° C. is preferred for concentrated nitric acid. The period of time for the refluxing is preferably from 30 minutes to 20 hours, and more preferably from 1 to 8 hours.

Carbon fine particles having a carboxyl group added (i.e., carbon fine particles carboxylic acid) are formed in the reaction solution after refluxing, and after cooling the solution to room temperature, the target carbon fine particles carboxylic acid can be obtained through separation operation and washing, depending on necessity.

(ii) Esterification

An alcohol is added to the resulting carbon fine particles carboxylic acid to effect dehydration and esterification, whereby the target functional group —COOR (wherein R represents a substituted or unsubstituted hydrocarbon group) can be introduced.

The alcohol used for the esterification is determined by the R in the functional group. That is, methanol is used for the case where R is $CH_3$, and ethanol is used for the case where R is $C_2H_5$.

A catalyst is generally used for esterification, and in the invention, a known catalyst, such as sulfuric acid, hydrochloric acid and toluenesulfonic acid, may be used. Sulfuric acid is preferably used as the catalyst in the invention since it causes no side reaction.

The esterification can be carried out in such a manner that an alcohol and a catalyst are added to the carbon fine particles carboxylic acid, and the mixture is refluxed at an appropriate temperature for an appropriate period of time. The temperature conditions and the time conditions herein cannot be determined unconditionally since they vary depending on the kind of the catalyst, the kind of the alcohol and the like, and the reflux temperature is preferably around the boiling point of the alcohol used. For example, in the case where methanol is used, the reflux temperature is preferably from 60 to 70° C. The period of time for refluxing is preferably from 1 to 20 hours, and more preferably from 4 to 6 hours.

After separating the reaction product from the reaction mixture after the esterification, followed by washing depending on necessity, to obtain carbon fine particles having a functional group —COOR (wherein R represents a substituted or unsubstituted hydrocarbon group) added thereto.

In the mixing step, the carbon fine particles each having a functional group are added with the crosslinking agent capable of causing a crosslinking reaction with the functional or the additive for crosslinking the functional groups, so as to prepare a crosslinking solution. In the mixing step, the other components described in the section "Other Additives" are also mixed in addition to the carbon fine particles each having a functional group and the crosslinking agent. It is preferred that the addition amount of the solvent or the viscosity adjusting agent under consideration of the coating applicability to prepare the crosslinking solution immediately before applying (coating).

Upon mixing, the components may be simply stirred with a spatula or stirred by a stirrer having stirring blades, a magnetic stirrer or a stirring pump, and the components may be strongly dispersed by using an ultrasonic dispersing machine or a homogenizer in order that the carbon fine particles are more uniformly dispersed to improve the storage stability or to form a network structure by crosslinking the carbon fine particles over the entire structure. In the case where a stirring machine imparting a strong shearing force for stirring, such as a homogenizer, is used, however, the stirring operation may be carried out for a short period of time for preventing the carbon fine particles from being pulverized or damaged.

The crosslinking solution thus prepared is then fed to or coated on the surface of the base body and then cured to form the carbon fine particle structure layer. The method of coating and the method of curing the solution will be described later in the section for the production process of the carbon fine particle structure.

The carbon fine particle structure of the invention contains carbon fine particles having been formed into a network structure. More specifically, the carbon fine particle structure is cured in a matrix form, in which the carbon fine particles are connected to each other through the crosslinked part, whereby the characteristic features inherent to the carbon fine particles, such as high conduction property of an electron and a positive hole, can be sufficiently exerted. In other words, the carbon fine particle stricture substantially only contains carbon fine particles closely connected to each other but does not contain any binder, so as to exert the characteristics inherent to the carbon fine particles to the maximum extent.

In the case where the carbon fine particle structure of the invention is formed as a layer, the thickness of the carbon fine particle layer may be widely selected from an extremely thin layer to a thick layer depending on purposes. An extremely thin coated film can be obtained by decreasing the content of the carbon fine particles in the crosslinking solution (simply by diluting the solution to decrease the content) and then coating the diluted solution to a thin film form, and a thick coated film can be obtained by increasing the content of the carbon fine particles in the solution. The coating operation may be repeated to obtain a thicker coated film. An extremely thin coated film may have a thickness of about 10 nm while it depends on the particle diameter of the carbon fine particles used, and a thicker coated film can be formed by repeatedly coating the solution without any upper limit. The thickness that can be obtained by one coating operation is generally about 2 μm. Furthermore, it is also possible that the crosslinking solution having an adjusted content of the carbon fine particles is charged and cured in a mold to obtain a desired shape.

In the case where the carbon fine particle structure is to be produced by the first process, the site where the carbon fine particles are crosslinked to each other, i.e., the crosslinked part formed through a reaction of the functional groups bonded to the carbon fine particles, has a crosslinked structure having the residual groups of the functional groups remaining after the crosslinking reaction.

As having been described, the crosslinking agent as a component of the crosslinking solution is preferably non-self-polymerizable. In the case where the crosslinking agent is non-self-polymerizable, the connecting group in the carbon fine particle structure layer finally produced is constituted by only one residual group of the crosslinking agent, and thus the distance among the carbon fine particles thus crosslinked can be controlled by the size of the residual group of the crosslinking agent used, whereby a desired network structure of the carbon fine particles can be obtained with high reproducibility. Furthermore, the substantial density of the carbon fine particles in the carbon fine particle structure can be increased since the crosslinking agent is not present in multiple among the carbon fine particles. Moreover, the distance among the carbon fine particles can be reduced to obtain such a state that the carbon fine particles are electrically and physically close to each other (i.e., such a state that the carbon fine particles are substantially in contact with each other) by reducing the size of the residual group of the crosslinking agent.

In the case where the carbon fine particle structure layer is produced by using such a crosslinking solution that contains a single functional group bonded to the carbon fine particles and a single non-self-polymerizable crosslinking agent, the crosslinked part in the layer has the same crosslinked structure (example 1). Even in the case where the carbon fine particle structure layer is produced by using such a crosslinking solution that contains plural kinds of functional groups bonded to the carbon fine particles and/or plural kinds of non-self-polymerizable crosslinking agents, the crosslinked part in the layer has a crosslinked structure of a combination of the functional group and the non-self-polymerizable crosslinking agent that are mainly used (example 2).

In the case where the carbon fine particle structure layer is produced by using such a crosslinking agent that contains a self-polymerizable crosslinking agent, irrespective as to whether the functional group of the carbon fine particles and the crosslinking agent are of a single kind or plural kinds, however, the crosslinked part crosslinking the carbon fine particles in the layer is such a state that contains many kinds of connecting groups having different numbers of the residual groups of the crosslinking agent connected to each other (polymerized), and thus the crosslinked part cannot be constituted by any primary-crosslinked structure.

In other words, by selecting a non-self-polymerizable crosslinking agent, the crosslinked part crosslinking the carbon fine particles in the carbon fine particle structure layer can be constituted by only one residual group of the crosslinking agent connected to the functional group, and thus the crosslinked part can be mainly constituted by the same crosslinked structure. The term "mainly constituted"

herein means not only such a case that all sites of the crosslinked part are of the same crosslinked structure (as in the aforementioned example 1), but also such a case that the crosslinked part mainly contains the crosslinked structure of the combination of the functional group and the non-self-polymerizable crosslinking agent that are mainly used (as in the aforementioned example 2).

In the case where the crosslinked part is mainly constituted by the same crosslinked structure, the lower limit of the proportion of the same crosslinked structure in the entire crosslinked part cannot be determined unconditionally since there may be cases of imparting a functional group or a crosslinked structure intending other purposes than the formation of the network structure of the carbon fine particles. However, in order to realize high electric or physical characteristics inherent to carbon fine particles with a firm network structure, the proportion of the same crosslinked structure in the entire crosslinked part is preferably 50% or more, more preferably 70% or more, and further preferably 90% or more, in terms of the number of sites of the crosslinked part, and most preferably, all the sites of the crosslinked part are formed of the same crosslinked structure. The proportion in terms of number can be determined by measuring the intensity ratio of absorption spectra corresponding to the crosslinked structures in an infrared absorption spectrum.

In the case where the carbon fine particle structure layer has the crosslinked part crosslinking the carbon fine particles with each other mainly containing the same crosslinked structure, a uniform network of the carbon fine particles can be formed, whereby the electric or physical characteristics can be uniform with good or intended conditions with high reproducibility.

The connecting group preferably has a hydrocarbon skeleton. The hydrocarbon skeleton referred herein means that the main chain of the connecting group, which connects the residual groups of the functional groups of the carbon fine particles to be crosslinked remaining after the crosslinking reaction, is formed of a hydrocarbon, and in the case where a hydrogen atom on the main chain is substituted by a substituent, the side chain is not considered herein. It is more preferred that the entire connecting group is formed only of a hydrocarbon.

The hydrocarbon preferably has from 2 to 10 carbon atoms, more preferably from 2 to 5 carbon atoms, and further preferably from 2 or 3 carbon atoms. The connecting group is not particularly limited as far as it is a divalent or higher valent group.

In the crosslinking reaction between the functional group —COOR (wherein R represents a substituted or unsubstituted hydrocarbon group) and ethylene glycol, which have been exemplified as a preferred combination of the functional group connected to the carbon fine particles and the crosslinking agent, the crosslinked part crosslinking the plural carbon particles with each other is —COO($CH_2$)$_2$OCO—.

In the crosslinking reaction between the functional group —COOR (wherein R represents a substituted or unsubstituted hydrocarbon group) and glycerol, the crosslinked part is —COOCH$_2$CHOHCH$_2$OCO— or —COOCH$_2$CH(OCO—) CH$_2$OH upon two hydroxyl groups contribute to the crosslinking reaction, and is —COOCH$_2$CH(OCO—)CH$_2$OCO— upon three hydroxyl groups contribute to the crosslinking reaction.

As having been described, the carbon fine particle structure formed by the first process has a network structure formed by crosslinking the plural carbon fine particles with plural sites of the crosslinked part, and thus it is not instabilized in contact state and arrangement state of the carbon fine particles, which are instabilized in a simple dispersed film of carbon fine particles.

The carbon fine particle structure formed by the second process has a crosslinked part formed by reacting the functional groups with each other, and thus the substantial density of the carbon fine particles in the carbon fine particle structure can be increased. Furthermore, the distance among the carbon fine particles can be in a state where the carbon fine particles are electrically and physically close to each other by reducing the size of the functional group, so as to facilitate exhibition of the characteristics of the carbon fine particles themselves. The crosslinked part crosslinking the carbon fine particles with each other in the carbon fine particle structure layer is formed of a chemical bond of the functional groups, and thus the structure mainly contains the same crosslinked structure. The term "mainly contain" herein means not only such a case that all sites of the crosslinked part are of the same crosslinked structure, but also such a case that the site of the crosslinked part having the crosslinked structure obtained by chemically bonding the functional groups are dominant in the entire crosslinked part.

In the case where the carbon fine particle structure layer has the crosslinked part crosslinking the carbon fine particles with each other mainly containing the same crosslinked structure, such a transporting layer can be obtained that has uniform electric characteristics.

As having been described, the carbon fine particle structure of the invention forms such a network structure that the plural carbon fine particles are chemically bonded through plural sites of the crosslinked part, and thus it is not instabilized in contact state and arrangement state of the carbon fine particles, which are instabilized in a simple dispersed film of carbon fine particles, so as to exert stably conduction characteristics for an electron and a positive hole. Furthermore, the pattern of the carbon fine particle structure layer is of high freedom as described later, and thus various shapes can be obtained as a transporting layer of an electronic device.

Specific Embodiments

A protective layer or other functional layers may be formed as an upper layer of the carbon fine particle structure layer thus patterned. Upon forming a protective layer as an upper layer of the carbon fine particle structure layer, the carbon fine particle structure as a network obtained by crosslinking carbon fine particles can be further firmly retained on the surface of the base body and can be protected from an external force. The protective layer may be a resist layer remaining but having not been removed, which will be described for the production process of the carbon fine particle structure. It is also effective that a protective layer is newly formed to cover the entire surface including the area thus patterned to the desired shape. As the material for constituting the protective layer, various kinds of resin materials and inorganic materials having been known in the art can be used depending on purposes.

The carbon fine particle structure layers may be accumulated through a certain functional layer. A highly integrated device can be produced in such a manner that a dielectric layer is formed as the functional layer, and the carbon fine particle layers patterned to appropriate shapes are accumulated and connected through interlayer connections. The interlayer connection may be realized by separately providing a carbon fine particle structure layer, by using other carbon fine particles as wiring by themselves, or using other materials, such as a metallic film, as wiring.

As having been described, the base body may be a substrate having flexibility or softness. In the case where the base body is a substrate having flexibility or softness, the flexibility of the entire structure is improved to enhance the degree of freedom in using environment thereof, such as installation locations.

Furthermore, in the case where a device is fabricated by using the carbon fine particle structure using a substrate having flexibility of softness, the structure can be applied to various arrangements and shapes of the device, whereby the carbon fine particle structure can be utilized with high implementation property.

Specific examples of the shape of the carbon fine particle structure will be described in the next section for the production process for the carbon fine particle structure. The constitutions described in the following are only examples, and the specific embodiments of the carbon fine particle structure of the invention are not limited to them.

(Production Process for Carbon Fine Particle Structure)

The production process for a carbon fine particle structure of the invention is suitable for producing the aforementioned carbon fine particle structure of the invention. Specifically, the production process contains (A) a applying step of applying, to a surface of a base body, a solution (crosslinking solution) containing plural carbon fine particles having a graphite structure and each having a functional group bonded thereto and, depending on necessity, a crosslinking agent or an additive for bonding the functional groups, and (B) a crosslinking step of crosslinking the functional groups to form a carbon fine particle structure constituting a network structure having the plural carbon fine particles crosslinked with each other.

The process may further contain, subsequent to the crosslinking step, other steps, such as (C) a patterning step of patterning the carbon fine particle structure to a desired pattern.

The production process for a carbon fine particle structure of the invention will be described in detail below for the respective process steps by referring to, as an example, a carbon fine particle structure electronic device using the carbon fine particle structure as a transporting layer.

(A) Applying Step

The applying step in the invention is a step of applying carbon fine particles having a graphite structure and each having a functional group bonded thereto to a surface of a base body. The applying step may be carried out by using the crosslinking solution having been described, and in the case where the carbon fine particle structure layer is to be formed as a thin layer, the solution may be coated on the surface of the base body.

It is sufficient that the area, on which the crosslinking solution is to be coated, contains the aforementioned desired area (the area, on which the transporting layer is to be formed), and it is not always necessary that the solution is fed to the entire surface of the base body.

The method of applying is preferably effected by coating the crosslinking solution, and the method for coating is not particularly limited and may be effected by various operations including a method of simply dropping droplets of the solution, a method of spreading the dropped solution with a squeegee, and the ordinary coating methods. Examples of the ordinary coating methods include the spin coating method, the wire bar coating method, the cast coating method, the roll coating method, the brush coating method, the dip coating method, the spray coating method and the curtain coating method.

The base body, the carbon fine particles each having a functional group, the crosslinking agent, the additive and the contents of the crosslinking solution may be those described for the carbon fine particle structure.

(B) Crosslinking Step

The crosslinking step in the invention is such a step that the coated crosslinking solution is cured to form the carbon fine particle structure constituting a network structure having the plural carbon fine particles crosslinked with each other. It is sufficient that the area, on which the carbon fine particle structure is to be formed by curing the crosslinking solution in the crosslinking step, contains the aforementioned desired area (the area, on which the transporting layer is to be formed), and it is not always necessary that the entire solution fed to the surface of the base body is cured.

The operation for the crosslinking step is necessarily determined depending on the combination of the functional group and the crosslinking agent. Examples thereof include those described in Table 1. In the case of the thermosetting combinations, the crosslinking solution may be heated with various kinds of heaters, and in the case of ultraviolet ray curable combinations, the crosslinking solution may be irradiated with an ultraviolet lamp or may be exposed to daylight. In the case of spontaneously curable combinations, it is sufficient that the crosslinking solution is allowed to stand as it is, and thus the operation of allowing to stand as it is can be also considered as an operation for the crosslinking step.

For example, in the case of the combination of carbon fine particles having the functional group —COOR (wherein R represents a substituted or unsubstituted hydrocarbon group) and a polyol (particularly glycerol and/or ethylene glycol among these), curing is carried out by heating (polyesterification through an ester exchange reaction). The group —COOR of the esterified carbon fine particles carboxylic acid and the polyol R'—OH (wherein R' represents a substituted or unsubstituted hydrocarbon group) undergo an ester exchange reaction). The reaction proceeds pluralistically to crosslink the carbon fine particles, and finally, the carbon fine particles are connected to each other to form a carbon fine particle structure having a network structure.

As examples of preferred conditions for the aforementioned combination, the heating temperature is preferably from 50 to 500° C., and more preferably from 150 to 200° C., and the heating time is preferably from 1 minute to 10 hours, and more preferably from 1 to 2 hours.

(C) Patterning Step

The patterning step in the invention is to pattern the carbon fine particle structure layer into a pattern corresponding to the transporting layer.

The operation for the patterning step is not particularly limited, and preferred examples thereof include the following two embodiments (C-A) and (C-B).

(C-A)

The carbon fine particle structure layer on the surface of the base body in an area except for the pattern corresponding to the transporting layer is removed by dry etching, so as to pattern the carbon fine particle structure layer to the pattern corresponding to the transporting layer.

Patterning the carbon fine particle structure layer by dry etching to the pattern corresponding to the transporting layer is such an operation that the carbon fine particle structure layer on the surface of the base body in an area except for the pattern is irradiated with a radical or the like. The specific method for the operation includes (C-A-1) a method of irradiating the carbon fine particle structure layer in the area except for the pattern is directly irradiated with a radical or the like, and (C-A-2) a method of covering the area except for the pattern with a resist layer, and then the entire surface of the base body (on which the carbon fine particle structure layer and the resist layer are formed) is irradiated with a radical or the like.

(C-A-1)

In the method, in which the carbon fine particle structure layer in the area except for the pattern is directly irradiated with a radical or the like, specifically, the carbon fine particle structure layer on the surface of the base body in the area except for the pattern corresponding to the transporting layer is removed by selectively irradiating the carbon fine particle structure layer in the area to pattern the carbon fine particle structure layer to the pattern corresponding to the transporting layer.

This method is preferred since ions of gas molecules can be irradiated in such a minute pattern in several nanometer order by using an ion beam, whereby the patterning for obtaining the pattern corresponding the transporting layer can be effected by one operation.

Examples of the gas species that can be used include oxygen, argon, nitrogen, carbon dioxide and sulfur hexafluoride, and oxygen is particularly preferred in the invention.

The ion beam irradiation is such a method that gas molecules in vacuum are accelerated by applying a voltage and are irradiated as a beam, and the target material and the irradiation accuracy can be changed by the species of the gas used.

(C-A-2)

The method, in which the area except for the pattern is covered with a resist layer, and then the entire surface of the base body is irradiated with a radical or the like, includes (C-A-2-1) a resist layer forming step of forming a resist layer on the carbon fine particle structure layer on the surface of the base body in the area of the pattern corresponding to the transporting layer, and (C-A-2-2) a removing step of removing the carbon fine particle structure layer exposed in the area except for the pattern by dry etching on the surface of the base body having the carbon fine particle structure layer and the resist layer accumulated thereon. The method may further contain (C-A-2-3) a resist layer removing step of removing the resist layer provided in the resist layer forming step.

(C-A-2-1) Resist Layer Forming Step

In the resist layer forming step, a resist layer is formed on the carbon fine particle structure layer on the surface of the base body in the area of the pattern corresponding to the transporting layer. The step may be carried out by the process generally referred to as a photolithography process, and a resist layer is not provided directly on the carbon fine particle structure layer in the area of the pattern corresponding to the transporting layer, but a resist layer is once formed on the entire surface of the base body having the carbon fine particle structure layer is formed thereon, and the area of the pattern corresponding to the transporting layer is exposed and developed to remove the part except for the exposed part, whereby such a state is finally obtained that the resist layer is provided on the carbon fine particles only in the area of the pattern corresponding to the transporting layer. There are also cases where the exposed area is removed by development, and the exposed area remains, depending on the kind of the resist.

The method of forming the resist layer may be those having been known in the art. Specifically, a resist agent is coated on the substrate by using a spin coater or the like, and then heated to form a resist layer.

The material (resist agent) for forming the resist layer is not particularly limited, and various materials having been used as resist materials may be used. Among these, the resist layer is preferably formed with a resin (i.e., a resin layer). The carbon fine particle structure layer has a network structure and is of a porous structure, and therefore, in the case where the resist layer is formed with such a material that forms a film only on the surface but does not penetrate into the pores, such as a metallized film, the carbon fine particles cannot be sufficiently shielded from the plasma. Accordingly, the plasma may invade into the carbon fine particle structure layer under the resist layer through the pores, so as to cause such a case where the outer dimension of the remaining carbon fine particle structure layer is reduced due to wrap-around of the plasma.

There may be considered such a measure that the outer shape (area) of the resist layer is made sufficiently larger than the pattern corresponding to the transporting layer with the reduction in dimension of the remaining carbon fine particle structure layer, but in this case, it is necessary that the interval between the patterns is increased to fail to form a dense pattern.

By using a resin as the material for the resist layer, the resin penetrates into the pores to suppress the carbon fine particles from being exposed to the plasma, and as a result, the carbon fine particle structure layer can be finely patterned.

Examples of the resin that mainly constitutes the resin layer include a novolak resin, polymethyl methacrylate and a mixture of these resins, but is not limited to them.

The resist material for forming the resist layer is a mixture of the resin material or a precursor thereof and a photosensitive material, and a resist material having been known in the art may be used in the invention. Examples thereof include OFPR800, produced by Tokyo Ohka Kogyo Co., Ltd., and NPR9710, produced by Nagase & Co., Ltd.

The operations and the conditions for exposing the resist layer before curing (which is heating in the case where the resist material is thermosetting, and may be appropriately selected for other kinds of resist materials) and those for developing the resist layer (for example, the wavelength of the light source, the exposure intensity, the exposure time, the exposure amount, the environmental conditions upon exposure, the kind and the concentration of the developer solution, the developing time, the developing temperature, and the details of the pre-treatment and the post-treatment) may be appropriately selected depending on the resist material used. In the case where a commercially available resist material is used, they may follow the instruction manual thereof. In general, for convenience of handling, the resist layer is exposed to the pattern corresponding to the transporting layer by using an ultraviolet ray, and then developed by using an alkali developer solution. The developer solution is then washed with water, followed by drying, to complete the photolithography process.

(C-A-2-2) Removing Step

In the removing step, the surface of the base body having the carbon fine particle structure layer and the resist layer accumulated thereon is subjected to dry etching to remove the carbon fine particle structure layer exposed in the area except for the area having the resist layer formed thereon.

The operation of the removing step may be the ordinary methods generally referred to as dry etching, and examples thereof include a reactive ion method. The method of using an ion beam described for the method (C-A-1) is also included in the dry etching herein.

The gas species, the equipments and the operation environments that can be selected are the same as those described for the method (C-A-1).

Examples of the gas species that can be generally selected for the dry etching include oxygen, argon and a fluorine gas (such as Freon, $SF_6$ and $CF_4$), and oxygen is preferred in the invention. By using an oxygen radical, the carbon fine particles of the carbon fine particle structure layer to be removed can be oxidized (burnt out) to convert to carbon dioxide, so as to eliminate influence of residual matters and to enable accurate patterning.

In the case where oxygen is selected as the gas species, an oxygen molecule is irradiated with an ultraviolet ray to generate an oxygen radical, which may be utilized. An equipment capable of generating an oxygen radical in this manner is commercially available under the name of UV Asher, which is easily available.

(C-A-2-3) Resist Layer Removing Step

The production process may be completed after completing the removing step (C-A-2-2), but in the case where the resist layer is to be removed, the resist layer removing step for removing the resist layer provided in the resist layer forming step is operated subsequent to the aforementioned removing step.

The operation for the resist layer removing step may be selected depending on the material used for forming the resist layer. In the case where the commercially available resist material is used, it may follow the instruction manual thereof. In the case where the resist layer is a resin layer, in general, it may be removed by making in contact with an organic solvent capable of dissolving the resin layer.

(C-B)

In this embodiment, the patterning step contains a resist layer forming step of forming a resist layer on the carbon fine particle structure layer on the surface of the base body in the area of the pattern corresponding to the transporting layer, and a removing step of removing the carbon fine particle structure layer exposed in the area except for the pattern by making the surface of the base body having the carbon fine particle structure layer and the resist layer accumulated thereon in contact with an etching solution.

The embodiment is such a method that is generally referred to as wet etching (in which an arbitrary part is removed by using a chemical solution, i.e., an etching solution).

The details of the resist layer forming step are the same as the resist layer forming step (C-A-2-1) except that such a resist layer is desirably used that has resistance to the etching solution. It is the same as the embodiment (C-A-2) that the resist layer may be removed subsequent to the removing step, and the details of the resist layer removing step may be the same as the resist layer removing step (C-A-2-3). Therefore, detailed descriptions therefor are omitted herein.

In the removing step, the carbon fine particle structure layer exposed in the area except for the pattern is removed by making the surface of the base body having the carbon fine particle structure layer and the resist layer accumulated thereon in contact with an etching solution.

The operation of making in contact with a solution herein means such a concept that includes all the operations of making a target material to the liquid, and the material may be making in contact with the liquid by any method including dipping, spraying, flowing and the like.

The etching solution is generally an acid or an alkali, and the selection of the etching solution is determined by the resist material constituting the resist layer and the crosslinked structure among the carbon fine particles in the carbon fine particle structure layer. It is preferred to use such an etching solution that is as incorrosive as possible to the resist layer, and facilitates the removal of the carbon fine particle structure layer.

However, an etching solution that corrodes the resist layer may also be used in the case where the carbon fine particle structure layer thus exposed can be removed before the resist layer completely disappears by controlling the temperature and the concentration of the etching solution and the contact time with the etching solution.

(D) Other Steps

The carbon fine particle structure can be produced through the aforementioned steps, and the process for producing a carbon fine particle structure of the invention may contain other steps.

For example, it is preferred that a surface treating step of previously treating the surface of the base body preceding the coating step. The surface treating step may be carried out, for example, for improving the adsorption property of the crosslinking solution thus coated, improving the adhesion property between the surface of the base body and the carbon fine particle structure layer provided thereon, cleaning the surface of the base body, and adjusting the electroconductivity on the surface of the base body.

Examples of the surface treating step carried out for improving the adsorption property of the crosslinking solution include a treatment with a silane coupling agent (such as aminopropyltriethoxysilane and γ-(2-aminoethyl)aminopropyltriethoxysilane). Among these, a surface treatment with aminopropyltriethoxysilane has been widely practiced and is preferred as the surface treating step in the invention. The surface treatment with aminopropyltriethoxysilane has been used for the surface treatment of a mica substrate used for the AFM observation of DNA as described in Y. L. Lyubchenko, et al., *Nucleic Acids Research*, vol. 21, pp. 1117-1123 (1993).

In the case where two or more layers of the carbon fine particle structure layers are accumulated, the operation of the production process for the carbon fine particle structure of the invention may be repeated twice or more. In the case where an intermediate layer, such as a dielectric layer or an insulating layer, is provided between the carbon fine particle structure layers, the operation of the production process for the carbon fine particle structure of the invention may be repeated with the step of forming the intermediate layer intervening therebetween.

In the case where plural electronic devices of the invention are integrated on the substrate, the plural electronic devices are produced in parallel in the respective patterning steps, and mutual wiring among the devices, resistances and capacitors is formed in the step of forming electrodes to constitute the circuits.

In the case where other layers, such as a protective layer and an electrode layer, is separately accumulated, steps for forming these layer are necessarily effected. These layers may be appropriately produced by selecting materials and methods suitable for the purposes thereof from the conventional materials and methods or by newly developing materials and methods for the invention.

For example, there are some cases where the electronic device suffers accelerated oxidation by increasing the electric current or suffers decrease in electroconductivity upon exposure to the air for a long period of time, depending on the structure of the carbon fine particle structure constituting the transporting layer. In the case where such a tendency is observed, a protective layer is preferably formed to cover the transporting layer for using the device stably for a long period of time and for using the device with a large electric current.

Examples of the protective layer (passivation film) for protecting the transporting layer include those having been generally used in semiconductor devices, such as an insulator of an inorganic material, e.g., silicon oxide, silicon nitride, aluminum oxide and titanium oxide, and an insulating organic material, e.g., an epoxy resin.

(Application Example of Production Process of Carbon Fine Particle Structure of the Invention)

As a useful application example of the production process of a carbon fine particle structure of the invention, it is possible that the carbon fine particle structure layer is once patterned on a surface of a preliminary substrate, and the layer is then transferred to the target base body. In the transferring step, it is possible that the carbon fine particle structure layer is once transferred from the patterned preliminary base body to a surface of an intermediate transfer material, and the layer is then transferred to the target base body (second base body).

As the preliminary substrate that can be used in this application example, those of the same materials as disclosed for the base body in the section of the carbon fine particle structure may be preferably used. The preliminary substrate preferably has at least one plane and more preferably is in a plate form under consideration of the transferring applicability in the transferring step.

The base body and the intermediate transfer material that can be used in this application example necessarily have an adhesive surface having an adhesive retained thereon or a surface capable of retaining an adhesive, and an ordinary adhesive tape, such as a cellophane adhesive tape, a paper adhesive tape, a cloth adhesive tape and an imide adhesive tape, may be used. They may be formed of other rigid material than the material having flexibility or softness like these tapes. Upon using a material having no adhesive retained, an adhesive is coated on the surface capable of retaining it, and the material can be used as the ordinary tape with the surface as an adhesive surface.

According to the application example, the carbon fine particle structure can be easily produced.

It is also possible that after preparing an assembly containing a base body having the carbon fine particle structure layer retained thereon, the carbon fine particle structure layer may be attached to the surface of the second base body (such as a chassis) along with the base body to produce the carbon fine particle structure.

In alternative, it is also possible that by using a carbon fine particle structure transcriptional body containing a preliminary substrate (or an intermediate transfer material) having the carbon fine particle structure layer retained thereon, only the carbon fine particle structure layer is transferred to the surface of the base body for constituting the carbon fine particle structure with the preliminary substrate (or the intermediate transfer material) being removed, whereby the carbon fine particle structure can be produced by users with no crosslinking step. While there are cases where the intermediate transfer material is used as the preliminary substrate of the carbon fine particle transcriptional body depending on the process, there is no necessity to distinguish these cases are from the case using the preliminary substrate, and thus these cases are included in the invention.

Because the carbon fine particle transcriptional body has the carbon fine particle structure layer in the crosslinked state carried on the preliminary substrate, the handling thereof is extremely convenient, and the carbon fine particle structure can be produced extremely easily by using the same. The preliminary substrate can be removed, for example, by simply releasing, chemically decomposing, burning out, melting, sublimating, or dissolving.

The production process of the carbon fine particle structure according to the application example is particularly effective in the case the base body is a material having such a nature and/or a shape that the production process of a carbon fine particle structure of the invention is difficult to be applied as it is.

For example, the application example of the invention is effective in the case where the temperature at which the crosslinking solution after coating is cured in the crosslinking step exceeds the melting point or the glass transition point of the material to be used as the base body of the carbon fine particle structure. In this case, the heating temperature is set at a temperature lower than the melting point of the preliminary substrate, whereby the heating temperature necessary for curing is ensured, and the carbon fine particle structure of the invention can be appropriately produced.

Furthermore, in an embodiment where the patterning step contains a step of removing the carbon fine particle structure layer on the surface of the preliminary substrate in the area except for the pattern corresponding to the desire shape by dry etching the carbon fine particle structure layer in the area to pattern the carbon fine particle structure layer to a pattern corresponding to the desired shape, the application example of the invention is effective in the case where the material to be used as the base body for the carbon fine particle structure has no resistance to the dry etching carried out in the patterning step. In this case, a material having resistance to the dry etching can be used as the preliminary substrate, whereby the resistance of the preliminary substrate to the operation in the patterning step is ensured, and the carbon fine particle structure of the invention can be appropriately produced.

The resistance and the material cannot be specifically determined unconditionally since they depend on the conditions for the dry etching, such as the gas species, the intensity, the period of time, the temperature and the pressure, and in the case where a resin material having relatively low resistance is used as the base body, the application example of the invention avoids the restrictions due to the low resistance. Therefore, application of a resin material to the base body is preferred from the standpoint that the advantages of the application example of the invention can be enjoyed. An inorganic material is suitable for the preliminary substrate owing to the relatively high resistance. Furthermore, a material having flexibility or softness generally has low resistance, and application of such a material to the base body is preferred from the standpoint that the advantages of the application example of the invention can be enjoyed.

Moreover, in an embodiment where the patterning step contains a resist layer forming step of forming a resist layer on the carbon fine particle structure layer on the surface of the preliminary substrate in the area of the pattern corresponding to the desired shape, and a removing step of removing the carbon fine particle structure layer exposed in the area except for the pattern by making the surface of the preliminary substrate having the carbon fine particle structure layer and the resist layer accumulated thereon in contact with an etching solution, the application example of the invention is effective in the case where the base body has no resistance to the etching solution, but the preliminary substrate has resistance thereto. In this case, the base body for the carbon fine particle structure is used as the base body in the application example, and a material having resistance to the etching solution is used as the preliminary substrate, whereby the resistance of the preliminary substrate to the operation in the patterning step is ensured, and the carbon fine particle structure of the invention can be appropriately produced.

The resistance and the material cannot be specifically determined unconditionally since they depend on the conditions of the etching solution, such as the kind, the concentration and the temperature thereof and the contact time therewith. For example, in the case where the etching solution is acidic, and a material capable of being corroded with an acid, such as aluminum, is used as the base body for the carbon fine particle structure, the application example of the invention avoids the restrictions due to the low resistance. While not clearly determined depending on the nature of the etching solution, the use of a material having low resistance to the etching solution avoids the restrictions due to the low resistance.

As still another embodiment, it is possible for obtaining a carbon fine particle base body having better handleability that the base body for carrying the carbon fine particle structure layer is attached to a second base body to fabricate the carbon fine particle structure of the invention and an apparatus using the same. The second base body may be a rigid material or a material having flexibility or softness, and the shape thereof may be selected from various shapes including a spherical shape and an irregular shape.

[Carbon Fine Particle Structure Electronic Device]

A transistor as a representative active electronic device is generally constituted by a source electrode and a drain electrode connected to a transporting layer, and a gate electrode disposed to enable application of an electric field to the transporting layer, in which an electric current is controlled or amplified between the source electrode and the drain electrode by applying a voltage to the gate electrode. A transistor having a dielectric film between the gate electrode and the transporting layer is referred to as a MOS-FET (metal oxide semiconductor field effect transistor), and a transistor using silicon as the transporting layer has been widely used.

The carbon fine particle structure electronic device of the invention will be described in detail below with reference to a preferred embodiment. A field effect transistor of the embodiment has a transporting layer constituted by the carbon fine particle structure containing plural carbon fine particles crosslinked with each other to form a network structure.

Figure 2:
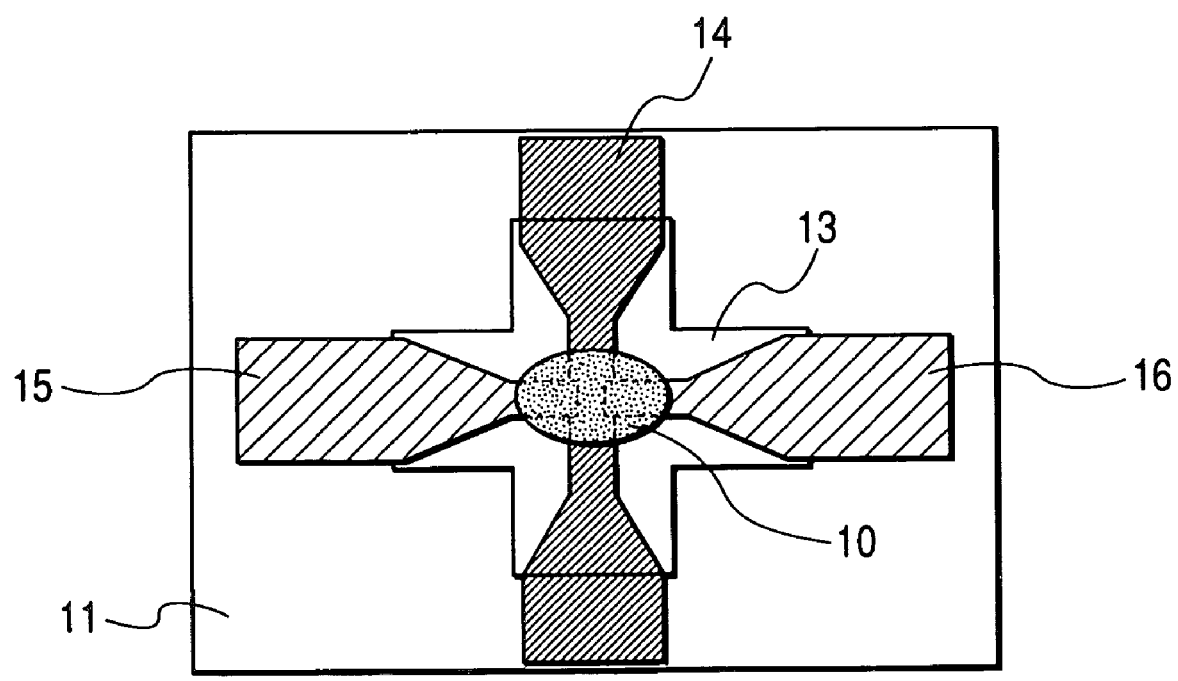
FIG. 2 is a plane view of the thin film transistor shown in FIG. 1.

FIG. 1 is a schematic cross sectional view showing an example of a MOS-FET (metal oxide semiconductor field effect transistor) type thin film transistor according to the embodiment, and FIG. 2 is a plane view thereof.

The field effect transistor of the embodiment has a silicon substrate as a base body 11 having accumulated therein a gate electrode 14, a gate dielectric film 13 formed of $HfO_2$, a transporting layer 10, a source electrode 15 and a drain electrode 16 accumulated in this order.

The transporting layer 10 is constituted by a carbon fine particle structure containing plural carbon fine particles having a graphite structure and a crosslinked part containing plural functional groups chemically bonded to each other, at least one ends of each of the functional groups being connected to different carbon fine particles, the plural carbon fine particles and the crosslinked part constituting a network structure (i.e., the carbon fine particle structure of the invention).

The three electrodes are provided on the transporting layer formed of the carbon fine particle structure having a network structure crosslinked at the crosslinked part through chemical bonds, and when an electric current is applied between the source and drain electrodes, and a voltage is applied to the gate electrode, the electric current can be controlled.

The transistor structure may also be a multi-gate structure having plural gate electrodes, and a structure having a gate electrode with a three-dimensional structure for improving the efficiency of the action of the electric field to the transporting layer. The arrangement of the gate electrode may also be various structures, such as a top gate type and a bottom gate type.

(Electrode)

The electrode used in the electronic device of the invention may be any material having electroconductivity, such as a metallic electrode, e.g., gold, aluminum, copper and platinum, and an organic material, e.g., an electroconductive polymer. In general, there are cases where a transporting layer is difficult to form on an electrode from the standpoint of crystal growth in a semiconductor device using a semiconductor crystal, but the transporting layer constituted by the carbon fine particle structure of the invention is free of such a restriction. However, it is preferred that the electrode material selected depending on the crosslinking solution (coating solution) to obtain good wettability of the coating solution upon coating, or the electrode is subjected to a surface treatment for improving the wettability.

The method for forming the electrode may be various methods having been used in the art, and for example, a method of vapor-depositing using a mask, a method using photolithography, and a method using electrode position.

The material for the base body is not particularly limited, and for carrying the transporting layer of the electronic device, it is preferred to use silicon, quartz, mica, quartz glass or the like to facilitate the patterning process.

However, there are cases where the carbon fine particle structure layer cannot be patterned directly on the surface of the base body depending on the shape and the nature of the base body, and in these cases, the patterned carbon fine particle structure layer is used after attaching to a second base body along with the base body, or in alternative, the patterned carbon fine particle structure layer is transferred. The procedures reduce the restrictions as the substrate that finally carries the electronic device.

The electronic device of the invention can be easily produced as described later even in the case where a substrate having flexibility or softness is used as the base body, and there is less possibility that the carbon fine particle structure layer formed on the substrate is broken upon deforming the substrate by bending owing to the crosslinked structure of the carbon fine particle structure layer, so as to prevent the capability of the device from being deteriorated due to the deformation. In the case where the carbon fine particle structure layer is used in an electronic device, in particular, loss of an electric path due to bending is prevented from occurring.

Examples of the substrate having flexibility or softness include various kinds of resins, such as polyethylene, polypropylene, polyvinyl chloride, polyamide and polyimide.

The electronic device of the invention has the carbon fine particle structure formed in such a state that plural fine carbon particles form a network structure through plural sites of the crosslinked part by chemically bonding, and thus it is not instabilized in contact state and arrangement state of the carbon fine particles, which are instabilized in a simple dispersed film of carbon fine particles, so as to exert stably conduction characteristics for an electron and a positive hole. The carbon fine particle structure layer has a high degree of freedom in pattern as described later, and thus the transporting layer can have various shapes.

The electronic device of the invention may have other layers than the carbon fine particle structure layer used as the transporting layer and the three electrodes.

For example, it is preferred to provide an adhesive layer between the surface of the base body and the carbon fine particle structure for improving the adhesion between them, whereby the adhesion strength of the patterned carbon fine particle structure is improved. The details of the adhesive layer, such as a formation method therefor, will be described later in the section for the production process of the electronic device.

A protective layer and various kinds of functional layers may be provided as an upper layer of the patterned carbon fine particle structure. By providing a protective layer as an upper layer of the transporting layer, the carbon fine particle structure as a network of crosslinked carbon fine particles can be firmly retained on the surface of the base body, so as to protect from an external force. The protective layer may be a resist layer, which will be described in the section of the production process of the electronic device, not being removed but remaining. It is also effective that a protective layer is newly provided to cover the entire surface including the patterned area of the transporting layer. As the material for constituting the protective layer, various kinds of resin material and inorganic material having been known in the art may be used without any problem depending on purposes.

Plural electronic devices may be provided on the same substrate to constitute an integrated circuit. Electronic devices using the carbon fine particle structure as a transporting layer can be easily integrated by combining the layer formation of the carbon fine particle structure by coating the solution and the patterning process therefor.

In alternative, a highly integrated device can be produced by accumulating transporting layers through dielectric layers and connecting the carbon fine particle structures through interlayer connection.

The interlayer connection may be realized by separately providing a carbon fine particle structure layer, by using other carbon fine particles as wiring by themselves, or using other materials, such as a metallic film, as wiring.

As having been described, the base body may be a substrate having flexibility or softness. In the case where the base body is a substrate having flexibility or softness, the applicable range of the electronic device can be enhanced. In particular, since the carbon fine particle structure used in the invention has the crosslinked part through chemical bonds, the flexibility inherent to the carbon fine particles can be effectively exerted, and thus the electronic device using the substrate having flexibility or softness has significantly high stability against deformation. Therefore, the structure can be applied to various arrangements, shapes and application modes of the device.

The specific shapes and the like of the electronic device of the invention having been described will be explained in the section for the production process for the electronic device. The constitutions described below are only examples, and the specific embodiments of the electronic device of the invention are not limited to them.

[Production Process of Electronic Device]

The process for producing an electronic device of the invention is a process suitable for producing the aforementioned electronic device of the invention, which is particularly a process for forming the transporting layer on the surface of the base body. Specifically, the production process contains (A) a applying step of applying, to a surface of a base body, at least carbon fine particles having a graphite structure and each having a functional group bonded thereto, and (B) a crosslinking step of crosslinking the functional groups to form a carbon fine particle structure constituting a network structure having the plural carbon fine particles crosslinked with each other. Upon-producing the electronic device, a step of forming an electrode is contained before or after the steps (A) and (B).

The process may further contain, depending on necessity, other steps, such as (C) a patterning step of patterning the carbon fine particle structure to a pattern corresponding to the transporting layer.

A process for producing a MOS-FET type carbon fine particle transistor shown in FIGS. 1 and 2 as an embodiment of the electronic device of the invention will be described for the respective steps with reference to FIGS. 3A to 3E and 4F to 4I.

FIGS. 3A to 3E and 4F to 4I are schematic cross sectional views showing an example of the production process of the carbon fine particle structure electronic device of the invention. FIGS. 3A to 3E and 4F to 4I show in this order cross sectional views of a base body during the production process.

(1) Gate Electrode Forming Step

Figure 3A:
FIGS. 3A to 3E are schematic cross sectional views showing an example of the production process of the carbon fine particle structure electronic device of the invention, in which the first half of the production process is shown in the sequence of the process.
Figure 3B:
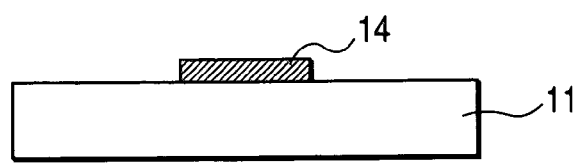

As shown in FIG. 3A, abase body 11 having a cleaned surface is prepared. The base body is placed in a vapor deposition equipment, and a metallic electrode to be a gate electrode 14 is vapor-deposited thereon as shown in FIG. 3B. The materials for the substrate and the electrode may be appropriately selected under consideration of resistance to etching and heating steps later.

(2) Gate Dielectric Forming Step

Figure 3C:
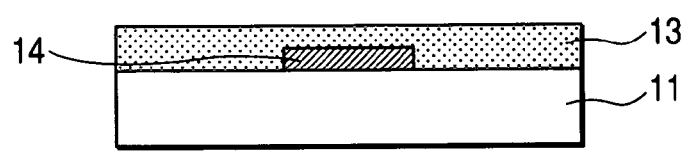

It is necessary in MOS-FET that a gate dielectric 13 is formed between the gate electrode 14 and the transporting layer 10. Accordingly, a gate dielectric 13 is provided on the surface of the base body 11 having the gate electrode 14 having been formed as shown in FIG. 3C.

In the case where an inorganic semiconductor material, such as silicon, is used as the transporting layer, a silicon oxide film or a silicon nitride film capable of forming a good interface to silicon has been used as the gate insulting film 13 for preventing increase of the interface level density due to surface oxidation of the semiconductor crystal. In the case where the carbon fine particle structure is used as the transporting layer, the conventional dielectric, such as a silicon oxide film, a silicon nitride film, an aluminum oxide film and a titanium oxide film, may be used since the conventional semiconductor process can be applied.

The method for forming the gate dielectric 13 depends on the material therefor, and a method of coating and baking an MOD (metal organic decomposition) material (organometallic material) and a vapor deposition method may be utilized.

(3) Source-Drain Electrode Forming Step

Figure 3D:
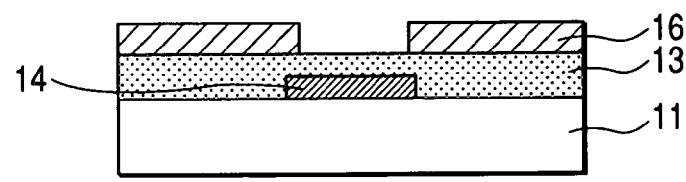
Figure 3E:
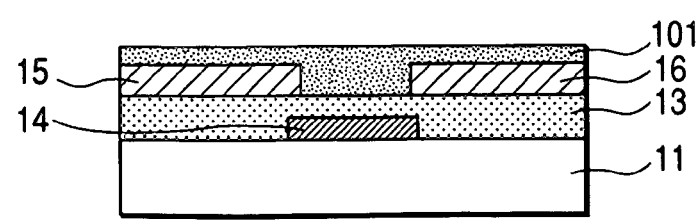

A source electrode 15 and a drain electrode 16 are formed as facing to each other on the gate dielectric 13 with a certain distance therebetween maintained in the same manner as in the gate electrode forming step (1). FIG. 3D is a schematic cross sectional view showing the state of the surface of the base body after completing the step. The material for the source and drain electrodes may be selected in the same manner as the gate electrode, and is preferably selected under consideration of the wettability to the gate dielectric and the carbon fine particle structure.

As having been described, the gate electrode is firstly formed as in the embodiment when a bottom gate type transistor is to be produced, and the source-drain electrode forming step and a transporting layer forming step will be effected prior to the gate electrode forming step when a top gate type transistor is to be produced.

(4) Applying Step

The operations for the steps of (4) a applying step and the later steps are basically the same as the operations of the steps of the applying step (A) and the later steps in the production process of a carbon fine particle structure having been described. Therefore, the generic matters of the details of these steps have been described in the applying step (A) to the other steps in the production process of a carbon fine particle structure, and the duplicated descriptions are omitted except for those described with reference to the drawings. Matters peculiar to the production of the carbon fine particle structure electronic device will be described.

In the applying step, a crosslinking solution 101 is fed to the surface of the base body 11 having the source electrode 15, the drain electrode 16 and the like formed thereon. It is sufficient that the area, to which the crosslinking solution 101 is to be fed in the applying step, contains the area, on which the transporting layer 10 is to be formed, and it is not always necessary that the entire solution is fed to the entire surface of the base body 11.

The other details are as described in the applying step (A) having been described.

(5) Crosslinking Step

In the crosslinking step, the crosslinking solution 101 after coating is cured to form a carbon fine particle structure layer 100 having plural carbon fine particles crosslinked to each other to constitute a network structure.

It is sufficient that the area, on which the carbon fine particle structure layer 100 is to be formed by curing the crosslinking solution in the crosslinking step, contains the area, on which the transporting layer 10 is to be formed, and it is not always necessary that the entire solution fed to the surface of the base body is cured.

The other details are as described in the crosslinking step (B) having been described.

(6) Patterning Step

In the patterning step, the carbon fine particle structure layer is patterned to a pattern corresponding to the transporting layer. FIGS. 4F to 4I are cross sectional views of the base body in the patterning step (6).

The operations of the patterning step are not particularly limited, and preferred examples thereof include the following two embodiments (6-A) and (6-B).

(6-A)

The carbon fine particle structure layer 100 on the surface of the base body 11 in an area except for the pattern corresponding to the transporting layer is removed by dry etching, so as to pattern the carbon fine particle structure layer 100 to the pattern corresponding to the transporting layer 10.

Patterning the carbon fine particle structure layer 100 by dry etching to the pattern corresponding to the transporting layer 10 is such an operation that the carbon fine particle structure layer 100 on the surface of the base body in an area except for the pattern is irradiated with a radial or the like. The specific method for the operation includes (6-A-1) a method of irradiating the carbon fine particle structure layer 100 in the area except for the pattern is directly irradiated with a radical or the like, and (6-A-2) a method of covering the area except for the pattern with a resist layer 17, and then the entire surface of the base body (on which the carbon fine particle structure layer and the resist layer are formed) is irradiated with a radical or the like.

(6-A-1)

In the method, in which the carbon fine particle structure layer 100 in the area except for the pattern is directly irradiated with a radical or the like, specifically, the carbon fine particle structure layer 100 on the surface of the base body in the area except for the pattern corresponding to the transporting layer is removed by selectively irradiating the carbon fine particle structure layer 100 in the area to pattern the carbon fine particle structure layer 100 to the pattern corresponding to the transporting layer 10.

The details of the method (6-A-1) are as described for the method (C-A-1) in the patterning step (C) having been described.

(6-A-2)

The method, in which the area except for the pattern is covered with a resist layer 17, and then the entire surface of the base body 11 is irradiated with a radical or the like, includes (6-A-2-1) a resist layer forming step of forming a resist layer 170 on the carbon fine particle structure layer 100 on the surface of the base body in the area of the pattern corresponding to the transporting layer, and (6-A-2-2) a removing step of removing the carbon fine particle structure layer 100 exposed in the area except for the pattern by dry etching on the surface of the base body having the carbon fine particle structure layer 100 and the resist layer 170 accumulated thereon. The method may further contain (6-A-2-3) a resist layer removing step of removing the resist layer 17 provided in the resist layer forming step.

(6-A-2-1) Resist Layer Forming Step

Figure 4F:
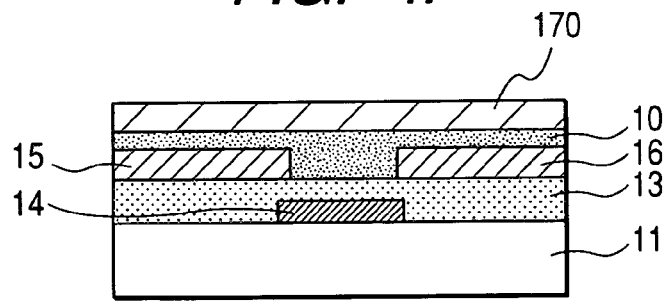
FIGS. 4F to 4I are schematic cross sectional views showing an example of the production process of the carbon fine particle structure electronic device of the invention, in which the last half of the production process is shown in the sequence of the process.

In the resist layer forming step, as shown in FIG. 4F, a resist layer 170 is formed on the carbon fine particle structure layer 100 on the surface of the base body in the area of the pattern corresponding to the transporting layer 10. The step may be carried out by the process generally referred to as a photolithography process, and a resist layer 17 is not provided directly on the carbon fine particle structure layer 100 in the area of the pattern corresponding to the transporting layer as shown in FIG. 4G, but a resist layer 170 is once formed on the entire surface of the base body 11 having the carbon fine particle structure layer 100 is formed thereon, and the area of the pattern corresponding to the transporting layer is exposed and developed to remove the part except for the exposed part, whereby such a state is finally obtained that the resist layer 17 is provided on the carbon fine particle structure layer 100 only in the area of the pattern corresponding to the transporting layer.

Figure 4G:
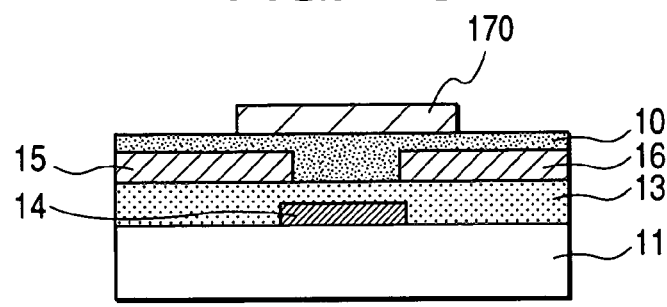

FIG. 4G is a schematic cross sectional view showing the state of the surface of the base body after completing the resist layer forming step (6-A-2-1). There are also cases where the exposed area is removed by development, and the exposed area remains, depending on the kind of the resist.

The details of the resist layer forming step (6-A-2-1) are as described for the resist layer forming step (C-A-2-1) having been described.

(6-A-2-2) Removing Step

Figure 4H:
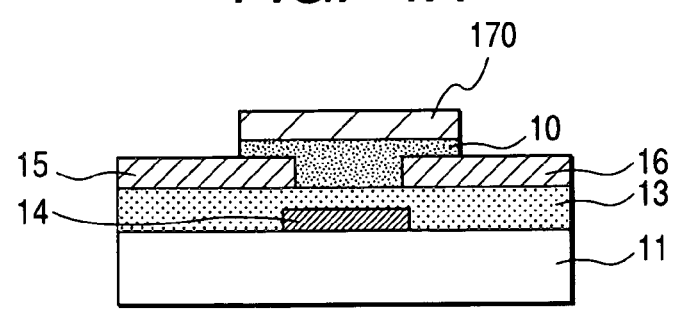

In the removing step, the surface of the base body 11 having the carbon fine particle structure layer 100 and the resist layer 17 accumulated thereon is subjected to dry etching to remove the carbon fine particle structure layer 100 exposed in the area except for the area having the resist layer formed thereon. As shown in FIG. 4G, the carbon fine particle structure layer 100 is exposed from the part, from which the resist layer 17 is removed. FIG. 4H is a schematic cross sectional view showing the state of the surface of the base body after completing the removing step (6-A-2-2).

The details of the removing step (6-A-2-2) are as described for the removing step (C-A-2-2) having been described.

(6-A-2-3) Resist Layer Removing Step

Figure 4I:
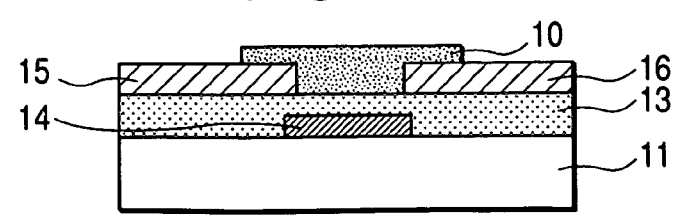

The production process of an electronic device of the invention may be completed after completing the removing step (6-A-2-2), but in the case where the resist layer 17 is to be removed, the resist layer removing step for removing the resist layer 17 provided in the resist layer forming step is operated subsequent to the aforementioned removing step. FIG. 4I is a schematic cross sectional view showing the state of the surface of the base body after completing the resist layer removing step (6-A-2-3).

The details of the resist layer removing step (6-A-2-3) are as described for the resist layer removing step (C-A-2-3) having been described.

(6-B)

In this embodiment, the patterning step contains a resist layer forming step of forming a resist layer on the carbon fine particle structure layer on the surface of the base body in the area of the pattern corresponding to the transporting layer, and a removing step of removing the carbon fine particle structure layer exposed in the area except for the pattern by making the surface of the base body having the carbon fine particle structure layer and the resist layer-accumulated thereon in contact with an etching solution.

In the removing step (6-B), as reference to FIG. 4G, the surface of the base body 11 having the carbon fine particle structure layer 100 and the resist layer 17 accumulated thereon is made in contact with an etching solution, so as to remove the carbon fine particle structure 100 exposed in the area except for the pattern.

The details of the embodiment (6-B) are as described for the embodiment (C-B) in the patterning step (C) having been described.

(7) Other Steps

The electronic device of the invention can be produced through the aforementioned steps, and the process for producing an electronic device of the invention may contain other steps. The details of the other steps are as described for the other steps (D) having been described.

(Application Example of Production Process of Electronic Device of the Invention)

As a useful application example of the production process of an electronic device of the invention, it is possible that the carbon fine particle structure layer is once patterned on a surface of a preliminary substrate, and the layer is then transferred to the target base body. In the transferring step, it is possible that the patterned carbon fine particle structure layer is once transferred from the preliminary substrate to a surface of an intermediate transfer material, and the layer is then transferred to the target base body (second base body).

The process for producing a MOS-FET type carbon fine particle transistor as one embodiment of the electronic device of the invention will be specifically described with reference to FIGS. 5A to 5E.

Figure 5A:
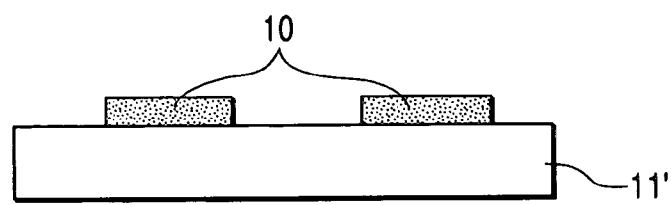
FIGS. 5A to 5E are schematic cross sectional views of a base body, showing an example of the production process of a carbon fine particle transistor by an embodiment of the production process of the electronic device of the invention, in which the steps are shown in the sequence of the process.

A carbon fine particle structure is formed on a preliminary substrate 11' and patterned to a shape corresponding to a transporting layer 11, in the same manner as having been described (FIG. 5A). In this embodiment, two pieces of the transporting layer are simultaneously formed on the preliminary substrate 11'.

Figure 5B:
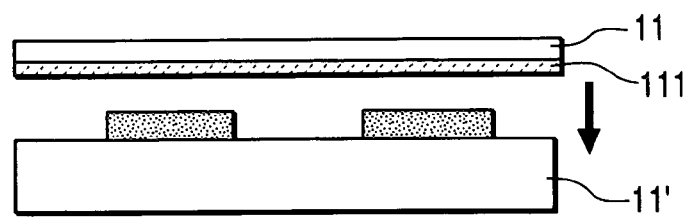
Figure 5C:
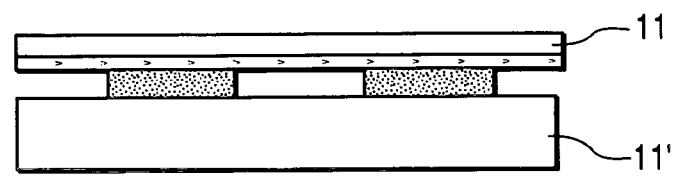

Subsequently, a base body 11 having an adhesive surface 111 is attached to the transporting layer 10 on the preliminary substrate 11' (FIGS. 5B and 5C).

Figure 5D:
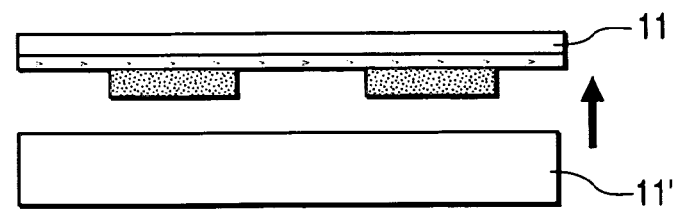

The base body 11 and the preliminary substrate 11' are released from each other to transfer the transporting layer 10 to the base body 11 (FIG. 5D).

Subsequently, a gate dielectric 13, a gate electrode 14, a source electrode 15 and a drain electrode 16 are formed by sputtering or the like method on the transporting layer 10 thus transferred to the base body 11.

Figure 5E:
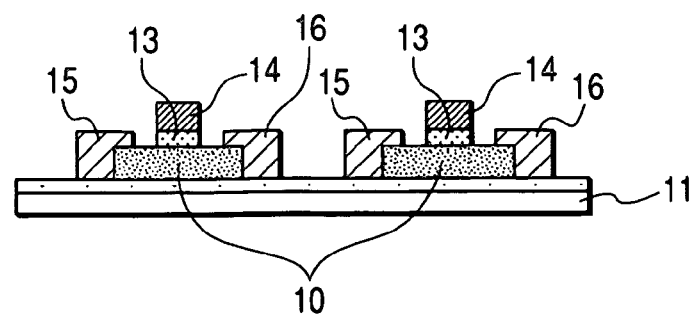

Consequently, two top gate type MOS-FET field-effect transistors are simultaneously formed on the surface of the base body 11 (FIG. 5E).

As the preliminary substrate that can be used in this application example, those of the same materials as disclosed for the base body in the section of the carbon fine particle structure electronic device may be preferably used. The preliminary substrate preferably has at least one plane and more preferably is in a plate form under consideration of the transferring applicability in the transferring step.

The base body and the intermediate transfer material that can be used in this application example necessarily have an adhesive surface having an adhesive retained thereon or a surface capable of retaining an adhesive, and an ordinary adhesive tape, such as a cellophane adhesive tape, a paper adhesive tape, a cloth adhesive tape and an imide adhesive tape, may be used. They may be formed of other rigid material than the material having flexibility or softness like these tapes. Upon using a material having no adhesive retained, an adhesive is coated on the surface capable of retaining it, and the material can be used as the ordinary tape with the surface as an adhesive surface.

According to the application example, the electronic device of the invention can be easily produced.

It is also possible that after preparing an assembly containing a base body having the carbon fine particle structure layer retained thereon, the carbon fine particle structure layer may be attached to the surface of the second base body (such as a chassis) having the three electrode for constituting the electronic device, along with the base body, so as to produce the electronic device.

In alternative, it is also possible that by using a carbon fine particle structure transcriptional body containing a preliminary substrate (or an intermediate transfer material) having the carbon fine particle structure layer retained thereon, only the carbon fine particle structure layer is transferred to the surface of the base body for constituting the electronic device with the preliminary substrate (or the intermediate transfer material) being removed, whereby the transporting layer of the electronic device can be produced by users with no crosslinking step. While there are cases where the intermediate transfer material is used as the preliminary substrate of the carbon fine particle transcriptional body depending on the process, there is no necessity to distinguish these cases are from the case using the preliminary substrate, and thus these cases are included in the invention. The three electrodes may be previously formed on the base body or formed after removing the preliminary substrate, so as to form the electronic device.

Because the carbon fine particle transcriptional body has the carbon fine particle structure layer in the crosslinked state carried on the preliminary substrate, the handling thereof is extremely convenient, and the electronic device can be produced extremely easily by using the same. The preliminary substrate can be removed, for example, by simply releasing, chemically decomposing, burning out, melting, sublimating, or dissolving.

The production process of the electronic device according to the application example is particularly effective in the case the base body is a material having such a nature and/or a shape that the production process of an electronic device of the invention is difficult to be applied as it is.

For example, the application example of the invention is effective in the case where the temperature at which the crosslinking solution after coating is cured in the crosslinking step exceeds the melting point or the glass transition point of the material to be used as the base body of the electronic device. In this case, the heating temperature is set at a temperature lower than the melting point of the preliminary substrate, whereby the heating temperature necessary for curing is ensured, and the electronic device of the invention can be appropriately produced.

Furthermore, in an embodiment where the patterning step contains a step of removing the carbon fine particle structure layer on the surface of the preliminary substrate in the area except for the pattern corresponding to the desire shape by dry etching the carbon fine particle structure layer in the area to pattern the carbon fine particle structure layer to a pattern corresponding to the desired shape, the application example of the invention is effective in the case where the material to be used as the base body for the electronic device has no resistance to the dry etching carried out in the patterning step. In this case, a material having resistance to the dry etching can be used as the preliminary substrate, whereby the resistance of the preliminary substrate to the operation in the patterning step is ensured, and the electronic device of the invention can be appropriately produced.

The resistance and the material cannot be specifically determined unconditionally since they depend on the conditions for the dry etching, such as the gas species, the intensity, the period of time, the temperature and the pressure, and in the case where a resin material having relatively low resistance is used as the base body, the application example of the invention avoids the restrictions due to the low resistance. Therefore, application of a resin material to the base body is preferred from the standpoint that the advantages of the application example of the invention can be enjoyed. An inorganic material is suitable for the preliminary substrate owing to the relatively high resistance. Furthermore, a material having flexibility or softness generally has low resistance, and application of such a material to the base body is preferred from the standpoint that the advantages of the application example of the invention can be enjoyed.

Moreover, in an embodiment where the patterning step contains a resist layer forming step of forming a resist layer on the carbon fine particle structure layer on the surface of the preliminary substrate in the area of the pattern corresponding to the desired shape, and a removing step of removing the carbon fine particle structure layer exposed in the area except for the pattern by making the surface of the preliminary substrate having the carbon fine particle structure layer and the resist layer accumulated thereon in contact with an etching solution, the application example of the invention is effective in the case where the base body has no resistance to the etching solution, but the preliminary substrate has resistance thereto. In this case, the base body for the electronic device is used as the base body in the application example, and a material having resistance to the etching solution is used as the preliminary substrate, whereby the resistance of the preliminary substrate to the operation in the patterning step is ensured, and the electronic device of the invention can be appropriately produced.

The resistance and the material cannot be specifically determined unconditionally since they depend on the conditions of the etching solution, such as the kind, the concentration and the temperature thereof and the contact time therewith. For example, in the case where the etching solution is acidic, and a material capable of being corroded with an acid, such as aluminum, is used as the base body for the electronic device, the application example of the invention avoids the restrictions due to the low resistance. While not clearly determined depending on the nature of the etching solution, the use of a material having low resistance to the etching solution avoids the restrictions due to the low resistance.

As still another embodiment, it is possible for obtaining an electronic device having better handleability that the base body for carrying the carbon fine particle structure is attached to a second base body to fabricate the electronic device of the invention and an apparatus using the same. The second base body may be a rigid material or a material having flexibility or softness, and the shape thereof may be selected from various shapes including a spherical shape and an irregular shape.

EXAMPLE

The invention will be described more specifically with reference to the following examples, but the invention is not construed as being limited thereto.

Example 1

A carbon fine particle structure having a carbon black-glycerol crosslinked film having semiconductor characteristics is produced by using carbon black as carbon fine particles.

(A) Applying Step (A-1) Preparation of Crosslinking Solution (Adding Step)

Figure 6:
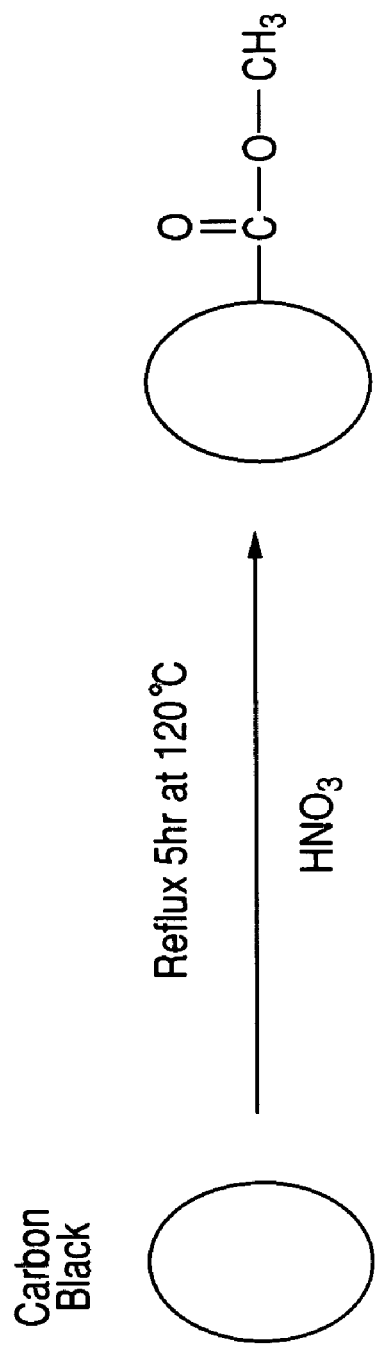
FIG. 6 is a reaction scheme of the synthesis of carbon black carboxylic acid in the adding step in Example 1.

(i) Addition of Carboxylic Group—Synthesis of Carbon Black Carboxylic Acid 1 g of carbon black powder (REGAL 330, a trademark, produced by Cabot Oil & Gas Corp., average particle diameter: 25 nm) is added to 50 mL of concentrated nitric acid (60% by mass aqueous solution, produced by Kanto Kagaku Co., Ltd.) and then refluxed at 120° C. for 6 hours to synthesize carbon black carboxylic acid. The reaction scheme of the reaction is shown in FIG. 6. The part of the carbon black is shown by a hollow elliptic shape in FIG. 6 (which is the same in other figures showing reaction schemes).

After the temperature of the solution is lowered to room temperature, the solution is subjected to centrifugal separation at 5,000 rpm for 15 minutes to separate a supernatant and a deposition from each other. The deposition thus recovered is dispersed in 10 mL of pure water, and then subjected to centrifugal separation at 5,000 rpm for 15 minutes to separate a supernatant and a deposition from each other, which is designated as one cycle of washing operation. The washing operation is repeated in 5 cycles, and the deposition is finally recovered.

The deposition thus recovered is measured for infrared absorption spectrum. For comparison, the carbon black as a raw material is also measured for infrared absorption spectrum. Upon comparing the spectra, absorption at 1,734 cm$^{-1}$ peculiar to carboxylic acid is observed in the spectrum of the deposition but is not observed in the spectrum of the carbon black raw material. It is understood from the result that a carboxyl group is introduced in to the carbon black through the reaction with nitric acid. That is, it is confirmed that the deposition is carbon black carboxylic acid.

Upon adding the deposition thus recovered in pure water, it is confirmed that the deposition has good dispersing property. The result supports the infrared spectrum indicating that a hydrophilic carboxyl group is introduced into the carbon black.

Figure 7:
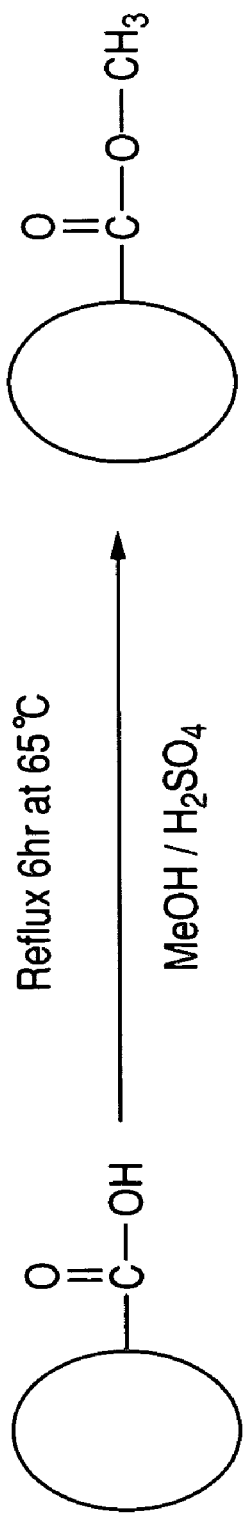
FIG. 7 is a reaction scheme of the esterification in the adding step in Example 1.

(ii) Esterification 30 mg of the carbon black carboxylic acid prepared in the aforementioned step is added to 50 mL of methanol (produced by Wako Pure Chemical Industries, Ltd.), to which 2 mL of concentrated sulfuric acid (98% by mass, produced by Wako Pure Chemical Industries, Ltd.), and the mixture is refluxed at 65° C. for 6 hours to achieve methyl-esterification. The reaction scheme of the reaction is shown in FIG. 7.

After the temperature of the solution is lowered to room temperature, a deposition is separated by filtration. The deposition is washed with water and then recovered. The deposition thus recovered is measured for infrared absorption spectrum. As a result, absorption at 1,734 cm$^{-1}$ and from 1,000 to 1,300 cm$^{-1}$ peculiar to the ester is observed, and thus it is confirmed that the carbon black carboxylic acid is esterified.

(Mixing Step)

15 mg of the methyl-esterified carbon black carboxylic acid obtained in the aforementioned step is added to 10 mL of glycerol (produced by Kanto Kagaku Co., Ltd.) and mixed by using an ultrasonic dispersing machine. 5 mL of methanol as a viscosity adjusting agent is added thereto to prepare a crosslinking solution (1).

(A-2) Surface Treatment Step of Base Body

A silicon wafer having a silicon oxide film formed on the surface thereof to impart insulating property (produced by Advantech Co., Ltd., diameter: 76.2 mm (3 inch), thickness: 380 μm, thickness of surface oxide film: 1 μm) is subjected to a surface treatment with aminopropyltriethoxysilane to improve adsorption between the crosslinking solution and the silicon wafer.

The surface treatment with aminopropyltriethoxysilane is carried out by exposing the silicon wafer to vapor of 50 μL of aminopropyltriethoxysilane (produced by Sigma-Aldrich Corp.) for 3 hours in a sealed dish.

(A-3) Applying (Coating) Step

The crosslinking solution (1 μL) prepared in the step (A-1) is dropped between source and drain electrodes on the surface of the silicon wafer having been subjected to the surface treatment.

(B) Crosslinking Step

Figure 8:
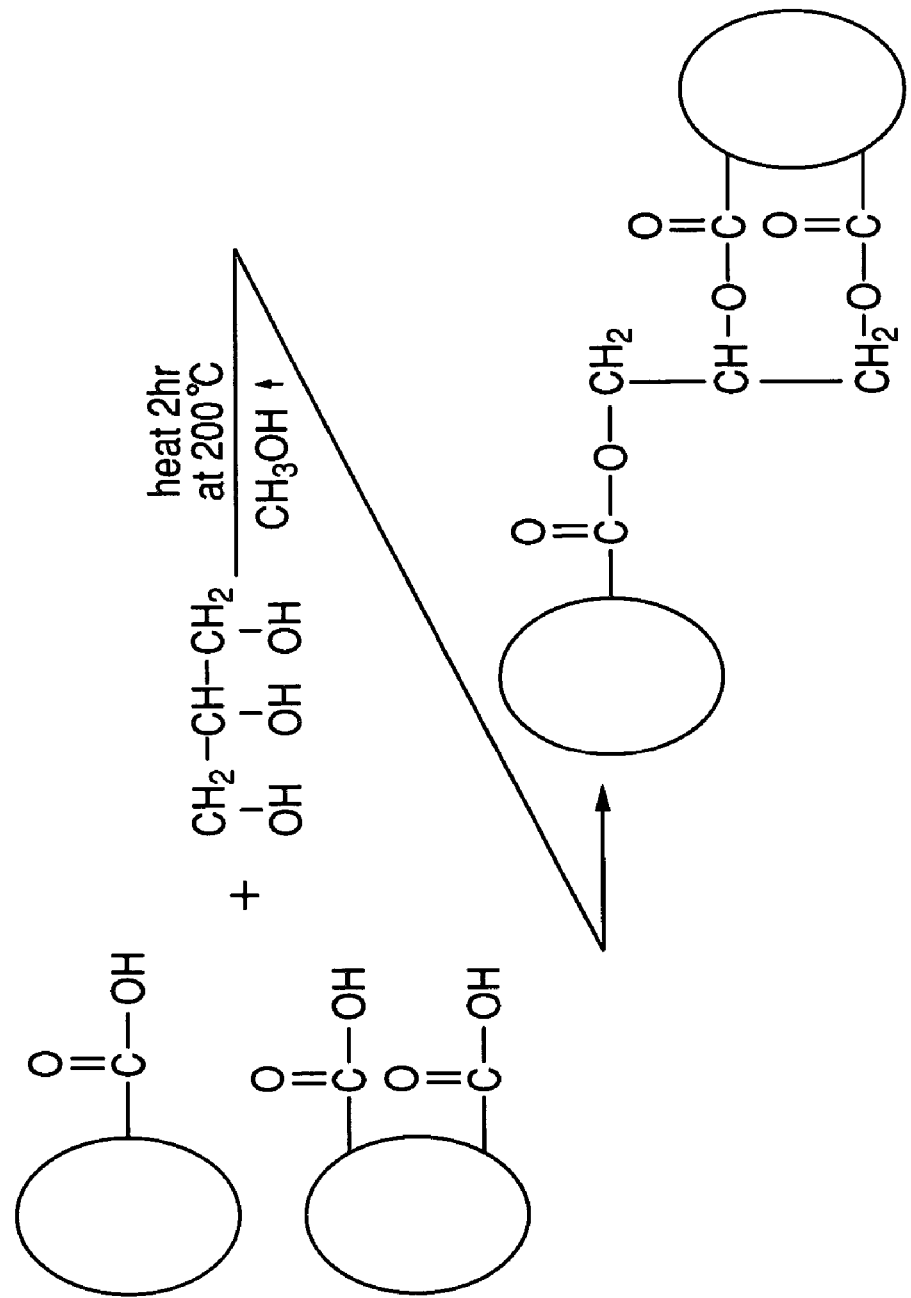
FIG. 8 is a reaction scheme of the crosslinking reaction by an ester exchange reaction in the crosslinking step in Examples 1 and 2.

After coating the crosslinking solution, the silicon wafer (base body) having a coated film formed thereon is heated to 150° C. for 2 hours to cure the coated film, whereby a device having a carbon fine particle structure of carbon black is obtained. The reaction scheme of the reaction is shown in FIG. 8.

Observation of the resulting carbon fine particle structure layer with an optical microscope reveals that a significantly uniform cured film is obtained.

Example 2

A field effect transistor (carbon fine particle structure electronic device) according to the embodiment shown in FIGS. 1 and 2 having a carbon fine particle structure, which is a carbon black-glycerol crosslinked film or Example 1, as a transporting layer, is produced. The production process will be described with reference to FIGS. 3A to 3E and 4F to 4I.

Titanium is used as the gate electrode 14, hafnium oxide is used as the gate dielectric 13, gold is used as a material for the source electrode 15 and the drain electrode 16, and contacts with the transporting layer 10 are formed therewith.

(Step of Surface Treatment of Base Body)

A silicon wafer having a silicon oxide film formed on the surface thereof to impart insulating property (produced by Advantech Co., Ltd., diameter: 76.2 mm (3 inch), thickness: 380 μm, thickness of surface oxide film: 1 μm) is used as the base body 11, on which a titanium thin film is vapor-deposited to 30 nm as the gate electrode 14, and hafnium oxide is further vapor-deposited thereon to 50 nm to form the gate dielectric 13. Subsequently, gold is vapor-deposited as the source electrode 15 and the drain electrode 16. The distance between the source and drain electrodes (i.e., the channel length) is 5 μm.

In order to improve the adsorption property of the crosslinking solution (100) to be coated thereon and the silicon wafer (base body 11), the silicon wafer (base body 11) is subjected to a surface treatment with aminopropyltriethoxysilane.

The surface treatment with aminopropyltriethoxysilane is carried out by exposing the silicon wafer (base body 11) to vapor of 50 μL of aminopropyltriethoxysilane (produced by Sigma-Aldrich Corp.) for 3 hours in a sealed dish.

(Applying (Coating) Step)

The crosslinking solution (1 μL) prepared in the step (A-1) is dropped between source and drain electrodes on the surface of the silicon wafer (base body 11) having been subjected to the surface treatment.

(Crosslinking Step)

After coating the crosslinking solution, the silicon wafer (base body 11) having a coated film formed thereon is heated to 150° C. for 2 hours to cure the coated film, whereby a device having a carbon fine particle structure layer 10 containing carbon black is obtained. The reaction scheme of the reaction is shown in FIG. 8.

Figure 9:
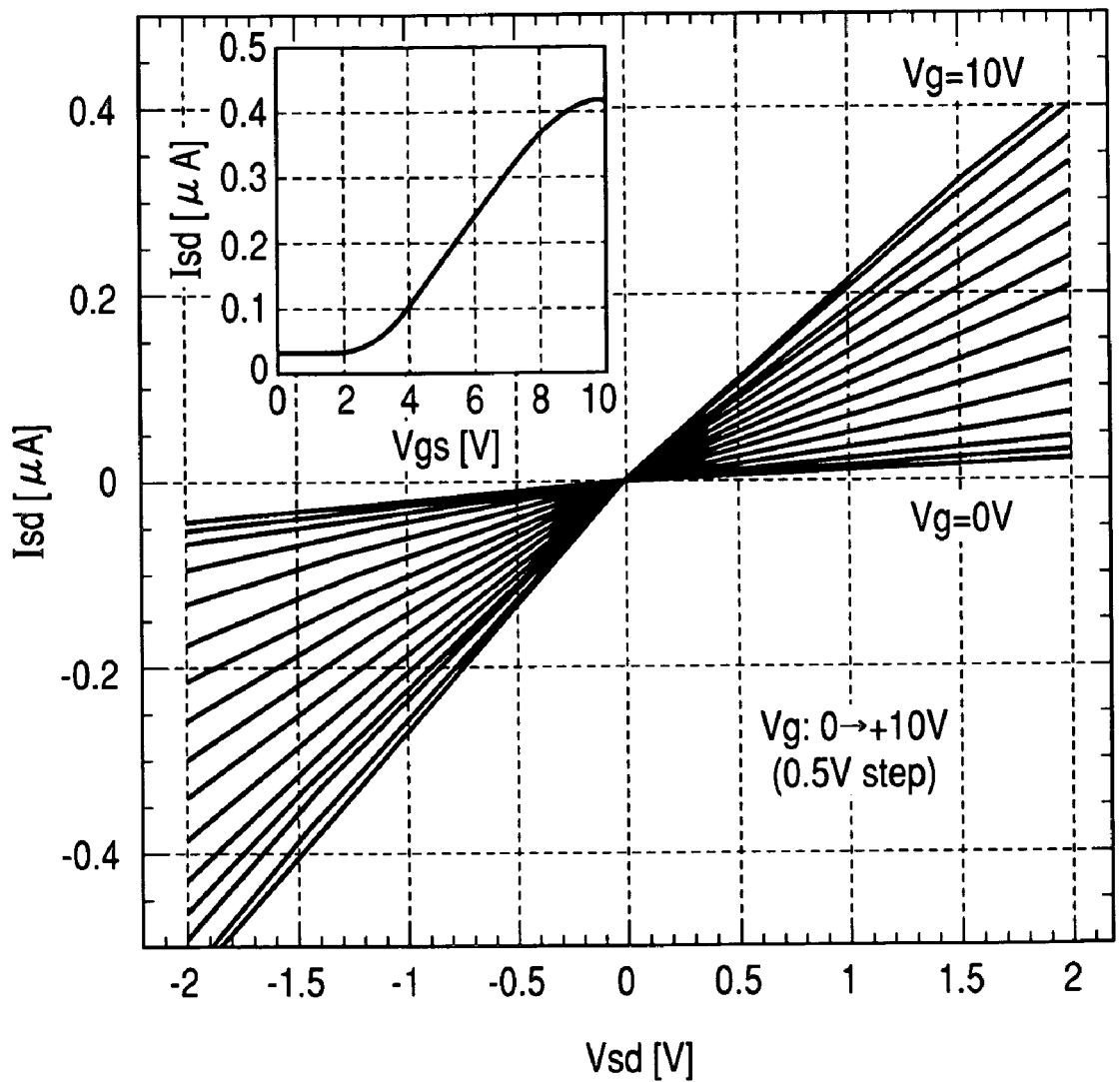
FIG. 9 is a graph showing the change of the current-voltage characteristics between the source and drain electrodes with respect to the gate voltage in the field effect transistor (electronic device) having a carbon fine particle structure as a transporting layer, which is a carbon black-glycerol crosslinked film, produced in Example 2.

The device is measured for the current-voltage characteristics with direct current between the source and drain electrodes with respect to the voltage Vgs of the gate electrode by using a semiconductor parameter analyzer 4156B (produced by Anton Technology Co., Ltd.). The results obtained are shown in FIG. 9. It is understood from the results that the conductivity between the drain and source electrodes is changed with respect to the gate voltage, and thus it is confirmed that the carbon fine particle structure functions as a transporting layer. The carbon black-glycerin crosslinked film exhibits an n-type behavior where the conductivity is increased with a positive gate voltage.

What is claimed is:

1. A carbon fine particle structure comprising:
   a plurality of carbon fine particles having a graphite structure; and
   a crosslinked part including a chemical bond of a plurality of functional groups bonded to the plurality of carbon fine particles, the chemical bond at least connecting one end of one of the carbon fine particles to another one of the fine particles,
   wherein the crosslinked part is formed by curing a plurality of carbon fine particles having a graphite structure and having a functional group bonded thereto with a crosslinking agent capable of undergoing a crosslinking reacting with the functional group, through a crosslinking reaction between the functional group of the carbon fine particles and the crosslinking agent, and
   wherein the crosslinked part comprises one chemical structure selected from the group consisting of —COOCH$_2$CHOHCH$_2$OCO—, —COOCH$_2$CH(OCO—)CH$_2$OH—, —COOCH$_2$CH(OCO—)CH$_2$OCO—, and —COO—C$_6$H$_4$—COO—,
   wherein the plurality of the carbon fine particles and the crosslinked part constitute a network structure.

2. The carbon fine particle structure according to claim 1, wherein the carbon fine particles are carbon black.

3. The carbon fine particle structure according to claim 1, wherein the carbon fine particles are graphite fine powder.

4. The carbon fine particle structure according to claim 1, wherein the crosslinked part has a crosslinked structure comprising residual groups of the functional groups remaining after the crosslinking reaction; and a connecting group having a hydrocarbon skeleton and connecting the residual group.

5. A carbon fine particle structure comprising:
   a plurality of carbon fine particles having a graphite structure; and
   a crosslinked part including a chemical bond of a plurality of functional groups bonded to the plurality of carbon fine particles, the chemical bond at least connecting one end of one of the carbon fine particles to another one of the fine particles,
   wherein the crosslinked part comprises a chemical bond obtained by reacting functional groups of the carbon fine particles with each other,
   wherein the crosslinked part comprises at least one chemical structure selected from the group consisting of —COOCO—, —O—, —COO—, —NCH—, —NH—, —S—, —NHCOO— and —S—S—, and
   wherein the plurality of the carbon fine particles and the crosslinked part constitute a network structure.

6. A solution for producing a carbon fine particle structure, comprising:
   at least a plurality of carbon fine particles having a graphite structure and each having a functional group bonded thereto, and a solvent, and
   a crosslinking agent for crosslinking the functional groups bonded to the plurality of carbon fine particles,
   wherein the crosslinking agent is glycerol or hydroquinone.

7. The solution according to claim 6, wherein the crosslinking agent functions as a solvent.

8. The solution according to claim 6, wherein the solution further contains an additive for forming a chemical bond of the functional groups bonded to the plurality of carbon fine particles.

9. The solution according to claim 8, wherein the additive is at least one of a condensing agent, a base and an oxidation reaction accelerating agent.

* * * * *